US011184837B2

(12) United States Patent
Aio et al.

(10) Patent No.: US 11,184,837 B2
(45) Date of Patent: Nov. 23, 2021

(54) WIRELESS TERMINAL, COMMUNICATION SYSTEM, AND WIRELESS TERMINAL CONTROL METHOD

(71) Applicant: SONY CORPORATION, Tokyo (JP)

(72) Inventors: Kosuke Aio, Kanagawa (JP); Tomoya Yamaura, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 10 days.

(21) Appl. No.: 16/606,048

(22) PCT Filed: Feb. 7, 2018

(86) PCT No.: PCT/JP2018/004118
§ 371 (c)(1),
(2) Date: Oct. 17, 2019

(87) PCT Pub. No.: WO2018/198472
PCT Pub. Date: Nov. 1, 2018

(65) Prior Publication Data
US 2020/0137674 A1 Apr. 30, 2020

(30) Foreign Application Priority Data
Apr. 26, 2017 (JP) .............................. JP2017-087282

(51) Int. Cl.
*H04W 48/16* (2009.01)
*H04W 84/12* (2009.01)
(52) U.S. Cl.
CPC ............ *H04W 48/16* (2013.01); *H04W 84/12* (2013.01)

(58) Field of Classification Search
CPC .............................. H04W 48/16; H04W 84/12
(Continued)

(56) References Cited

U.S. PATENT DOCUMENTS

| 2003/0123405 | A1 | 7/2003 | Del Prado et al. |
| 2017/0064739 | A1 | 3/2017 | Hedayat et al. |
| 2019/0082467 | A1* | 3/2019 | Nunome ............. H04W 74/006 |

FOREIGN PATENT DOCUMENTS

| CN | 107926043 A | 4/2018 |
| JP | 2008-219776 A | 9/2008 |

(Continued)

OTHER PUBLICATIONS

Po-Kai-Haung, "11ax D0.3 Comment Resolution for Two NAVs—Part II", Wireless LANs, IEEE, Sep. 12, 2016, 07 pages.
(Continued)

*Primary Examiner* — Chuck Huynh
(74) *Attorney, Agent, or Firm* — Chip Law Group

(57) ABSTRACT

Frame collisions are prevented in a communication system in which wireless communication is performed in accordance with the IEEE 802.11 standard. A communication unit receives terminal list information including respective addresses of wireless terminals belonging to a predetermined network. In a case where a frame the destination of which is an address included in the transmitted terminal list information is received, a control unit sets a period to prohibit data transmission until communication in the predetermined networks is completed, and in a case where a frame the destination of which is another address not included in the terminal list information is received, the control unit sets a period to prohibit data communication until communication in a network to which the other address belongs is completed.

10 Claims, 25 Drawing Sheets

(58) Field of Classification Search
USPC ............................................. 370/338
See application file for complete search history.

(56) References Cited

FOREIGN PATENT DOCUMENTS

| | | |
|---|---|---|
| JP | 2015-149602 A | 8/2015 |
| WO | 2017/035798 A1 | 3/2017 |
| WO | 2017/195458 A1 | 11/2017 |

OTHER PUBLICATIONS

Khorov, et al., "Multiple NAVs for Spatial Reuse", IEEE, Document: 802.11-15/1348, Nov. 9, 2015, 11 pages.
Extended European Search Report of EP Application No. 18790109.5, dated Feb. 25, 2020, 08 pages.
International Search Report and Written Opinion of PCT Application No. PCT/JP2018/004118, dated May 1, 2018, 09 pages of ISRWO.
Po-Kai Huang, "11ax D0.3 Comment Resolution for Two NAVs—Part II", Wireless LANs, IEEE P802.11, Sep. 12, 2016, 07 pages.
Khorov, et al., "Multiple NAVs for Spatial Reuse", IEEE, 802.11-15/1348, Nov. 9, 2015, 11 pages.

\* cited by examiner

| BSSID | MAC ADDRESS OF WIRELESS TERMINAL |
|---|---|
| 01:23:45:67:89:01 (BSS 501: INTERNAL) | 01:23:45:67:89:1A (WIRELESS TERMINAL 201) |
| | 01:23:45:67:89:1B (WIRELESS TERMINAL 202) |
| | 01:23:45:67:89:1C (WIRELESS TERMINAL 203) |
| 01:23:45:67:89:02 (BSS 502: EXTERNAL) | 01:23:45:67:89:2A (WIRELESS TERMINAL 204) |
| 01:23:45:67:89:03 (BSS 503: EXTERNAL) | 01:23:45:67:89:3A (WIRELESS TERMINAL 205) |

| TYPE OF NAV | EXPIRATION TIME |
|---|---|
| Intra-BSS NAV | HH:MM:SS |
| Basic NAV | HH:MM:SS |

| | BSSID | EXPIRATION TIME |
|---|---|---|
| Intra-BSS NAV | 01:23:45:67:89:01 (BSS501) | HH:MM:SS |
| Inter-BSS NAV | 01:23:45:67:89:02 (BSS502) | HH:MM:SS |
| | 01:23:45:67:89:02 (BSS503) | HH:MM:SS |
| Basic NAV | null | HH:MM:SS |
| | ⋮ | ⋮ |

WIRELESS TERMINAL, COMMUNICATION SYSTEM, AND WIRELESS TERMINAL CONTROL METHOD

CROSS REFERENCE TO RELATED APPLICATIONS

This application is a U.S. National Phase of International Patent Application No. PCT/JP2018/004118 filed on Feb. 7, 2018, which claims priority benefit of Japanese Patent Application No. JP 2017-087282 filed in the Japan Patent Office on Apr. 26, 2017. Each of the above-referenced applications is hereby incorporated herein by reference in its entirety.

TECHNICAL FIELD

The present technique relates to a wireless terminal, a communication system, and a wireless terminal control method. Specifically, the present technique relates to a wireless terminal, a communication system, and a wireless terminal control method in which wireless communication is performed in accordance with the IEEE (the Institute of Electrical and Electronics Engineers) 802.11 standard.

BACKGROUND ART

In a wireless LAN (Local Area Network), the IEEE 802.11 standard is conventionally, widely used. In such a wireless LAN, a certain wireless terminal STA_A fails to receive a signal from another wireless terminal STA_B, and thus, cannot detect presence of the wireless terminal STA_B, in some cases. This wireless terminal STA_B is called a hidden terminal.

In the IEEE 802.11 standard, RTS (Request To Send)/CTS (Clear To Send) flow control is used in order to prevent frame collisions between the wireless terminal STA_A and the hidden terminal STA_B. For example, a communication system has been proposed in which RTS/CTS flow control is performed in a case where there is a hidden terminal, and RTS/CTS flow control is not performed in a case where there is no hidden terminal (for example, see PTL 1). In the RTS/CTS flow control, upon receiving an RTS frame or a CTS frame addressed to a different terminal, a wireless terminal sets a NAV (Network Allocation Vector) during which data transmission is prohibited, on the basis of data in the frame. The wireless terminal refrains from transmission of an RTS frame until the set NAV is expired. The NAV is initialized by a CF (Contention Free)-End frame which is transmitted at the time of completion of communication.

CITATION LIST

Patent Literature

[PTL 1]
Japanese Patent Laid-Open No. 2015-149602

SUMMARY

Technical Problem

According to the aforementioned conventional technique, as a result of the RTS/CTS flow control, frame collisions with a hidden terminal can be prevented to some extent. However, even when the RTS/CTS flow control is performed, a frame collision may occur in a predetermined case.

For example, a case where, in a BSS (Basic Service Set) including presence of a hidden terminal, a wireless terminal receives a CTS frame from a base station and sets a NAV, is discussed. When the wireless terminal receives a CF-End frame from the outside of the BSS before the elapse of the NAV, the wireless terminal 202 may initialize the NAV while the hidden terminal is under communication. Accordingly, if the wireless terminal starts data transmission to the inside of the BSS after initialization of the NAV, a frame collision with the hidden terminal may occur. Also in other cases, frame collisions may occur due to various causes. Thus, a problem that there is a case where frame collisions cannot be prevented even by RTS/CTS flow control, has arisen.

The present technique has been made in view of these circumstances, and an object thereof is to prevent frame collisions in a communication system in which wireless communication is performed in accordance with the IEEE 802.11 standard.

Solution to Problem

The present technique has been made in order to solve the above problem, and a first aspect thereof is a wireless terminal and a wireless terminal control method, the wireless terminal including a communication unit receiving terminal list information including respective addresses of wireless terminals belonging to a predetermined network, and a control unit that, in a case where a frame a destination of which is the address included in the received terminal list information is received, setting a period to prohibit data transmission until communication in the predetermined network is completed, and in a case where a frame a destination of which is another address not included in the terminal list information is received, setting a period to prohibit data communication until communication in a network to which the other address belongs is completed. Accordingly, an effect that a period to prohibit data transmission is set on the basis of the terminal list information, is provided.

Further, in the first aspect, the predetermined network may include an internal network to which the base station and the wireless terminal belong, and an external network which does not fall under the internal network. Accordingly, an effect that a period to prohibit data transmission is set in each of the inner network and the external network, is provided.

Further, in the first aspect, in a case where the frame the destination of which is the address belonging to the internal network is received, the control unit may set the period to prohibit data transmission as an internal transmission prohibition period, and in a case where the frame the destination of which is the address belonging to the external network or the other network is received, the control unit may set the period to prohibit data transmission as a basic transmission prohibition period. Accordingly, an effect that the internal transmission prohibition period and the basic transmission prohibition period are set on the basis of the terminal list information, is provided.

Further, in the first aspect, in a case where the frame the destination of which is the address belonging to the internal network is received, the control unit may set the period to prohibit data transmission as an internal transmission prohibition period, and in a case where the frame the destination of which is the address belonging to the external network is received, the control unit may set the period to prohibit data transmission as an inter-network transmission prohibition period separately for each external network, and in a case where the frame the destination of which is the other address is received, the control unit may set the period to prohibit data transmission as a basic transmission prohibition period. Accordingly, an effect that a period to prohibit data transmission is set separately for each external network, is provided.

Further, in the first aspect, the communication unit may regularly receive terminal address information including the addresses corresponding to the internal network, and the control unit may update the terminal list information on the basis of the terminal address information. Accordingly, an effect that the terminal list information is updated with the terminal address information is provided.

Further, in the first aspect, the communication unit may receive changed terminal address information including an address of at least one of, among the wireless terminals, a terminal that is newly connected to the internal network and a terminal that is disconnected from the internal network, and the control unit may update the terminal list information on the basis of the changed terminal address information. Accordingly, the terminal list information is updated with the changed terminal address information is provided.

Further, in the first aspect, the communication unit may perform communication in accordance with the IEEE (the Institute of Electrical and Electronics Engineers) 802.11 standard, and the frames may include a CTS (Clear To Send) frame. Accordingly, an effect that, in a case where the wireless terminal receives a CTS frame, a period to prohibit data transmission is set, is provided.

A communication system includes a base station generating and transmitting terminal list information including respective addresses of wireless terminals belonging to a predetermined network, and a wireless terminal that, in a case where a frame a destination of which is the address included in the transmitted terminal list information is received, setting a period to prohibit data transmission until communication in the predetermined network is completed, and in a case where a frame a destination of which is another address not included in the terminal list information is received, setting a period to prohibit data communication until communication in a network to which the other address belongs is completed. Accordingly, an effect that a period to prohibit data transmission is set on the basis of the terminal list information is provided.

Further, in a second aspect, the base station may exchange the terminal address information with another base station by unicasting and regularly transmits, to the wireless terminal, terminal address information including an address corresponding to the internal network, and the base station may update the terminal list information on the basis of the exchanged terminal address information. Accordingly, an effect that the terminal list information is updated on the basis of the exchanged terminal address information is provided.

Advantageous Effect of Invention

According to the present technique, an excellent effect that frame collisions can be prevented in a communication system in which wireless communication is performed in accordance with the IEEE 802.11 standard. Note that the effects described above are not necessarily limited, and any one of those described in the present disclosure may be adopted.

BRIEF DESCRIPTION OF DRAWINGS

FIG. 3 is a diagram illustrating one example of terminal list information according to the first embodiment of the present technique.

FIG. 4 is a diagram illustrating one example of a NAV management table according to the first embodiment of the present technique.

FIG. 19 is a diagram illustrating one configuration example of a NAV management table according to a second embodiment of the present technique.

DESCRIPTION OF EMBODIMENTS

Hereinafter, embodiments for implementing the present technique (hereinafter, referred to as embodiments) will be described. The descriptions will be given in the following order.

1. First Embodiment (Example in which a NAV is set on the basis of terminal list information)
2. Second Embodiment (Example in which a NAV is set for each external BBS on the basis of terminal list information)
3. Third Embodiment (Example in which terminal address information is regularly transmitted, and a NAV is set on the basis of terminal list information)
4. Fourth Embodiment (Example in which changed terminal address information is transmitted, and a NAV is set on the basis of terminal list information)
5. Fifth Embodiment (Example in which terminal address information is exchanged, and a NAV is set on the basis of terminal list information)

1. First Embodiment

[Configuration Example of Communication System]

Figure 1:
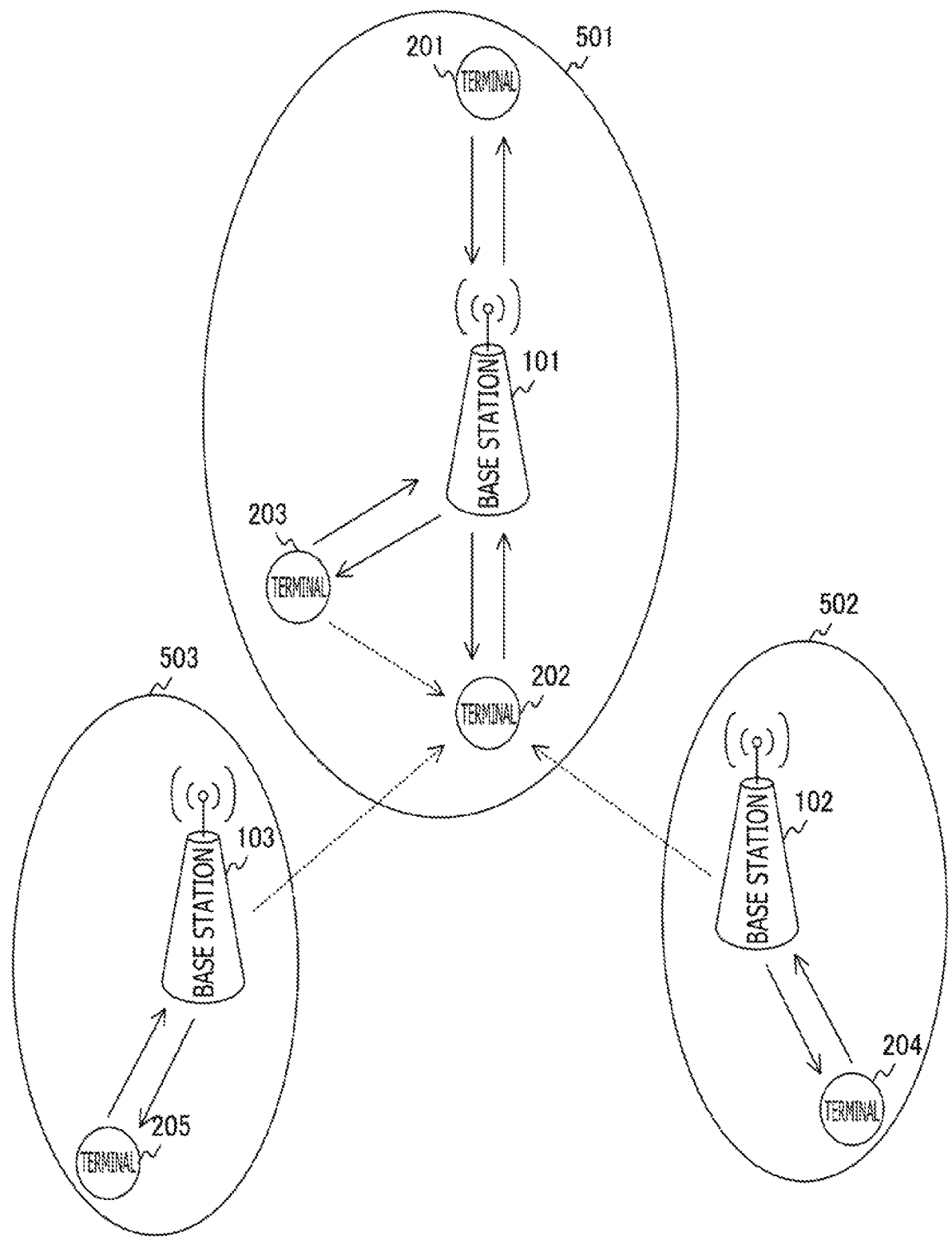
FIG. 1 is an entire view illustrating one configuration example of a communication system according to a first embodiment of the present technique.

FIG. 1 is an entire view illustrating one configuration example of a communication system according to a first embodiment of the present technique. The communication system includes a predetermined number of BSSs such as BSSs 501 to 503. Here, a BSS refers to a network including a base station and a wireless terminal connected to the base station. Thus, a network including a base station and a wireless terminal is also called an infrastructure network. Note that each of the BSSs is one example of the network set forth in the claims.

The BSS 501 includes a base station 101 and wireless terminals 201 to 203, for example. The BSS 502 includes a base station 102 and a wireless terminal 204, for example. The BSS 503 includes a base station 103 and a wireless terminal 205, for example. BSS IDs (Basic Service Set ID) for identifying the BSSs are allocated to the respective BBSs. As a BSS ID, a MAC address of a base station is used, for example. Note that a base station is also called an access point or a master unit. A wireless terminal is also called a slave unit. In addition, each of a base station and a wireless terminal is also called a wireless station.

Here, each of the BSS 501 and the like is formed by connecting each wireless terminal to the base station. In the IEEE 802.11 standard, a wireless terminal transmits an association request for requesting connection to a base station, and the base station returns an association response for acknowledging connection, so that the wireless terminal is allowed to be connected to the base station.

When connection to the base station has succeeded, the wireless terminal holds the MAC (Media Access Control) address of the base station, and the base station also holds the MAC address of the wireless terminal. Therefore, in each BSS, the base station holds at least the MAC addresses of all the wireless terminals in the BSS, and the wireless terminal holds at least the MAC address of the base station.

In addition, within a radio-wave reachable range, the base station 101, etc. and the wireless terminal 201, etc. can mutually transmit and receive data on a frame basis in accordance with the IEEE 802.11 standard. Hereinafter, a wireless station (base station or wireless terminal) that transmits a frame is referred to as "transmission station," and a wireless station that receives a frame is referred to as "reception station." For example, in a case where a base station transmits a frame to a wireless terminal, the base station is a transmission station while the wireless terminal is a reception station.

Also, examples of the IEEE 802.11 standard include various types such as the IEEE 802.11a and the IEEE 802.11b. In the aforementioned communication system, the IEEE 802.11ax is used, for example.

In the IEEE 802.11 standard, in order to avoid collisions in a BSS, wireless terminals each determine whether a medium is in a busy state or an idle state. One scheme therefor is a CSMA/CA (Carrier Sense Multiple Access/Collision Avoidance) scheme. In the CSMA/CA scheme, when transmitting data, wireless terminals each detect a medium and determine the state thereof. The detection procedure is called carrier sensing. In carrier sensing, a wireless station determines that a medium is in the busy state when the signal intensity of a signal received from another wireless station is greater than a predetermined threshold. In a case where the medium is not in the busy state (that is, in the idle state), the wireless terminal starts data transmission after the elapse of a waiting time decided at random.

When the aforementioned hidden terminal is not included, frame collisions can be avoided by the aforementioned CSMA/CA scheme. However, in actuality, a hidden terminal may be generated in a case where an obstacle exists between wireless terminals or in a case where the distance between wireless terminals exceeds the radio-wave reachable range. For example, in carrier sensing, the wireless terminal 202 is assumed to be able to receive signals indicated by dotted-line arrows illustrated in FIG. 1. Note that solid-line arrows indicate signals transmitted and received by the wireless stations after the idle state is determined in carrier sensing. In this radio-wave condition, the wireless terminal 202 can receive signals greater than the threshold from the wireless terminal 203, the base station 102, and the base station 103, in carrier sensing, as indicated by the doted-line arrows. In contrast, the wireless terminal 202 cannot receive any signals greater than the threshold from the wireless terminal 201 etc. Therefore, the wireless terminal 201 falls under a hidden terminal to the wireless terminal 202.

When a hidden terminal such as the wireless terminal 201 exists, a wireless station cannot detect that the BSS is in the busy state due to communication being performed by the hidden terminal, so that a frame collision may occur. This is called a hidden terminal problem. In order to solve the hidden terminal problem, RTS/CTS flow control is used in the IEEE 802.11 standard.

RTS/CTS flow control is a control method of starting data transmission when, prior to data transmission, a wireless station has transmitted an RTS frame for requesting data transmission and received a CTS frame for permitting the transmission.

Here, RTS/CTS flow control is schematically described on the basis of an assumption that a wireless station that transmits an RTS frame is the wireless terminal 202 and a wireless station that returns a CTS frame is the base station 101, for example. Note that, alternatively, a wireless station that transmits an RTS frame may be a base station, and a wireless station that returns a CTS frame may be a wireless terminal.

First, prior to transmission of a data frame, the wireless terminal 202 transmits an RTS frame for requesting data transmission to the base station 101.

When the base station 101 having received the RTS frame is not under communication with another wireless station, the base station 101 returns a CTS frame to the wireless terminal 202 after the elapse of a fixed time period. Another wireless terminal (wireless terminal 203 or the like) having received the RTS frame or the CTS frame sets a NAV as a period to prohibit data transmission. Here, the wording "set" a NAV means holding a time at which the NAV expires, in a storage unit such as a memory. Until the NAV expires, the wireless station refrains from data transmission.

Then, the wireless terminal 202 having received the CTS frame starts data transmission. When the data transmission is normally completed, the base station 101 returns an ACK (ACKnowledge) frame to the wireless terminal 202, so that the communication is completed.

The wireless terminal 202 having received the ACK frame, broadcasts a CF-End frame. Even before the elapse of the NAV, another wireless station (wireless terminal 203 or the like) having received the CF-End frame determines that the communication has been completed and initializes the NAV. Here, the wording "initialize" a NAV means that the expiration time of the NAV is updated to an initial value such that the NAV is set to an unset state. Thus, the reason that a NAV is initialized by a CF-End frame is to prevent a wireless station from unnecessarily refraining from data transmission because, in many cases, the NAV is set to be longer than an actual data transmission time.

By the aforementioned RTS/CTS flow control, the hidden terminal problem can be solved to a certain extent and collisions can be suppressed. However, in a predetermined case, a collision may occur even with use of the RTS/CTS flow control. Therefore, the base station 101 generates, as terminal list information for each BSS confirmed by the base station 101, information including the BSS ID and the respective addresses of wireless terminals belonging to the BSS, and transmits the terminal list information to the wireless terminals by broadcasting etc. Also, the wireless terminals each receive and hold the terminal list information so as to share the terminal list information with the base station. A method for using the terminal list information will be described in detail later. Hereinafter, a BSS to which each wireless station belongs is referred to as "Intra-BSS" to the wireless station.

For example, the BSS 501 is an Intra-BSS to the wireless stations in the BSS 501, and the other BSSs 502 and 503 are external BSSs to the wireless stations in the BSS 501. Further, the wireless terminal 201 etc. holds at least the MAC address (BSS ID) of the base station in the Intra-BSS, as described above. Thus, by referring to the received terminal list information, the wireless terminal 201 etc. can determine whether or not a wireless terminal related to an RTS frame or a CTS frame is a terminal in the Intra-BSS. Note that the BSS 501 is one example of the internal network set forth in the claims, and each of the BSSs 502 and 503 is one example of the external network set forth in the claims.

Note that, although the communication system including the three base stations 101 to 103 and the five wireless terminals 201 to 205 has been given as an example, the configuration of the communication system is not limited to this configuration. The number of base stations may be other than three, and may be one or two, and also, the number of the wireless terminals may be other than five.

[Configuration Example of Base Station]

Figure 2:
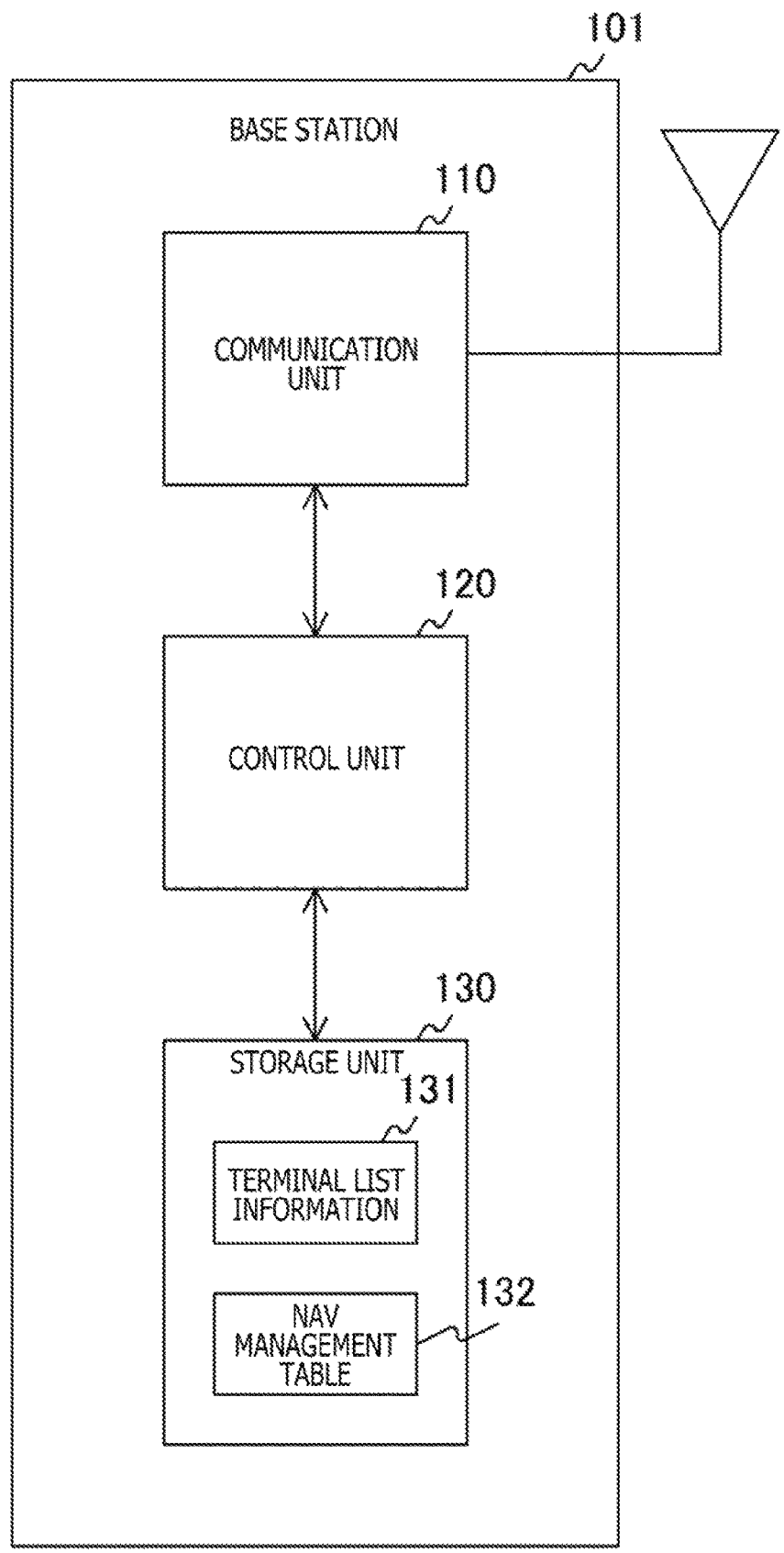
FIG. 2 is a block diagram illustrating one configuration example of a base station according to the first embodiment of the present technique.

FIG. 2 is a block diagram illustrating one configuration example of the base station 101 according to the first embodiment of the present technique. The base station 101 includes a communication unit 110, a control unit 120, and a storage unit 130. The configuration of each of the base stations 102 and 103 is similar to that of the base station 101.

The communication unit 110 is configured to wirelessly transmit/receive data on a frame basis to/from another wireless station. The whole of signal processing in a data link layer and a physical layer related to transmission/reception of data is executed at the communication unit 110.

The control unit 120 is configured to control the entire base station 101. The control unit 120 sets various parameters for the communication unit 110. Further, the control unit 120 generates terminal list information 131 and causes the storage unit 130 to store the terminal list information. Then, the control unit 120 updates the terminal list information each time the wireless terminal 201 or the like is connected to or disconnected from the BSS 501, and controls the communication unit 110 to transmit the updated terminal list information to the wireless terminal.

Then, when the communication unit 110 receives an RTS frame or CTS frame in RTS/CTS flow control, the control unit 120 determines whether or not the transmission station or reception station of the frame is a terminal in the Intra-BSS, by referring to the terminal list information.

In a case where the wireless station related to the RTS frame or the CTS frame is not a terminal in the Intra-BSS, the control unit 120 sets a Basic NAV. Here, a Basic NAV is a period during which data transmission is prohibited until the expiration time is elapsed or until communication outside the Intra-BSS is completed. Here, the wording "communication is completed" refers to a time when a CF-End frame is received, for example. Note that a Basic NAV is one example of the basic transmission prohibition period set forth in the claims.

In contrast, in a case where the wireless station related to the RTS frame or the CTS frame is a terminal in the Intra-BSS, the control unit 120 sets an Intra-BSS NAV on the basis of information in the frame. Here, an Intra-BSS NAV is a period during which data transmission is prohibited until the expiration time is elapsed or until communication in the Intra-BSS is completed. Here, the wording "communication is completed" refers to a time when a CF-End frame is received, for example. Note that an Intra-BSS NAV is one example of the internal transmission prohibition period set forth in the claims.

Accordingly, an Intra-BSS NAV is set in addition to a Basic NAV, whereby a NAV is initialized by a frame from either the inside or the outside of the Intra-BSS. Thus, a problem of occurrence of collisions can be eliminated.

An Intra-BSS NAV and a Basic NAV are separately set, and the control unit 120 causes the communication unit 110 to refrain from data transmission during these periods. In a case where both an Intra-BSS NAV and a Basic NAV are set, the communication unit 110 can start data transmission after both the periods are initialized.

Thus, a scheme for setting the two types of NAVs, an Intra-BSS NAV and a Basic NAV, has been taken into consideration in the IEEE 802.11ax standard. In the IEEE 802.11ax standard, public information under consideration can be acquired from the following URL.

http://mentor.ieee.org/802.11/documents

However, the IEEE 802.11ax standard is under consideration and the details thereof are not fixed. In addition, a step of transmitting and receiving terminal list information by means of a wireless station, and setting a NAV by using the terminal list information, is not described in the aforementioned public information.

The storage unit 130 is configured to store various data such as the terminal list information 131 and a NAV management table 132. The periods of an Intra-BSS NAV and a Basic NAV are written in the NAV management tables 132.

FIG. 3 is a diagram depicting one example of the terminal list information 131 according to the first embodiment of the present technique. The terminal list information 131 includes, for each BSS, the BSS ID and the respective MAC addresses of wireless terminals belonging to the BSS.

For example, it is assumed that the three BSSs 501 to 503 are present, the wireless terminals 201 to 203 are connected in the BSS 501, the wireless terminal 204 is connected in the BSS 502, and the wireless terminal 205 is connected in the BSS 503. In this case, in the terminal list information, the MAC addresses of the wireless terminals 201 to 203 are written in association with the BSS ID of the BSS 501. Further, the MAC address of the wireless terminal 204 is written in association with the BSS ID of the BSS 502, and the MAC address of the wireless terminal 205 is written in association with the BSS ID of the BSS 503.

Note that, although FIG. 3 depicts the terminal list information including the respective MAC addresses of the three BSSs 501 to 503, the number of BSSs is not limited to three. The base station may generate terminal list information including a MAC address for each of BSSs the number of which is other than three. As described above, the base station necessarily holds the MAC addresses in the Intra-BSS. Thus, the terminal list information includes at least the MAC addresses in the Intra-BSS.

FIG. 4 is a diagram depicting one configuration example of the NAV management table 132 according to the first embodiment of the present technique. In the NAV management table 132, the expiration time of the Intra-BSS NAV and the expiration time of the Basic NAV are each written in an hour/minute/second form such as "HH:MM:SS." In the initial state, an invalid initial value such as "99:99:99" or a NULL value is written as the expiration time.

To set a NAV, the base station 101 acquires a duration value from a received frame, and sets, as the expiration time, a time obtained by adding the duration value to the current time. The duration value will be described later. However, in a case where a target NAV has been already set, the base station 101 compares a latest time obtained by adding a new acquired duration value to the current time, with the set expiration time, and updates the expiration time to the latest time only when the latest time is longer.

[Configuration Example of Wireless Terminal]

Figure 5:
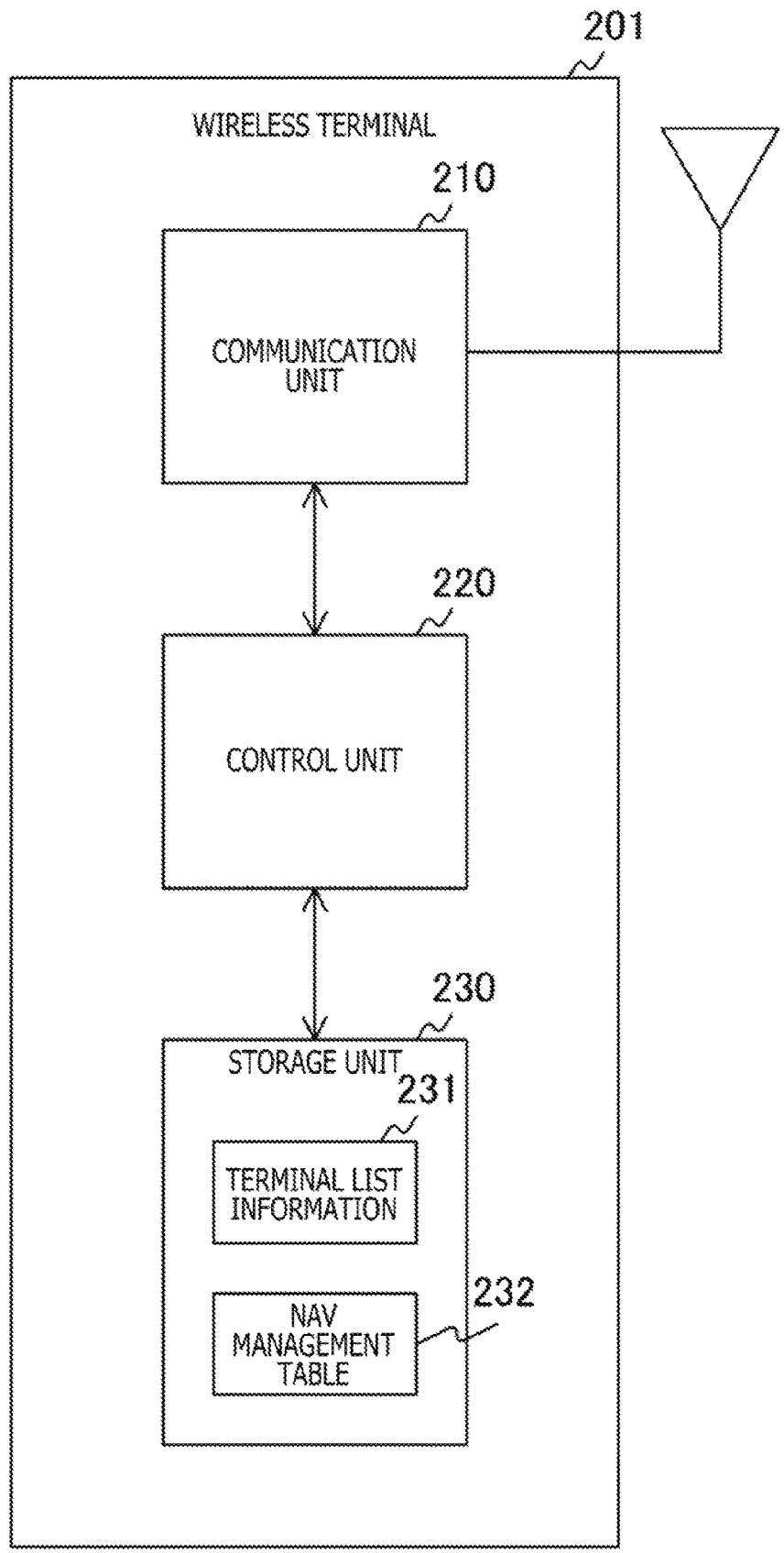
FIG. 5 is a block diagram illustrating one configuration example of a wireless terminal according to the first embodiment of the present technique.

FIG. 5 is a block diagram illustrating one configuration example of the wireless terminal 201 according to the first embodiment of the present technique. The wireless terminal 201 includes a communication unit 210, a control unit 220, and a storage unit 230. The configuration of each of the other wireless terminals such as the wireless terminal 202 and the wireless terminal 203 is similar to that of the wireless terminal 201.

The communication unit 210 is configured to wirelessly transmit/receive data on a frame basis, to/from another wireless station. Also, the communication unit 210 receives terminal list information from the base station.

The configuration of the control unit 220 is similar to that of the control unit 120 of the base station 101, except that the control unit 220 does not generate or transmit terminal list information.

The storage unit 230 is configured to store various data such as terminal list information 231 and a NAV management table 232.

[Example of Data Structure of Frame]

Figure 6:
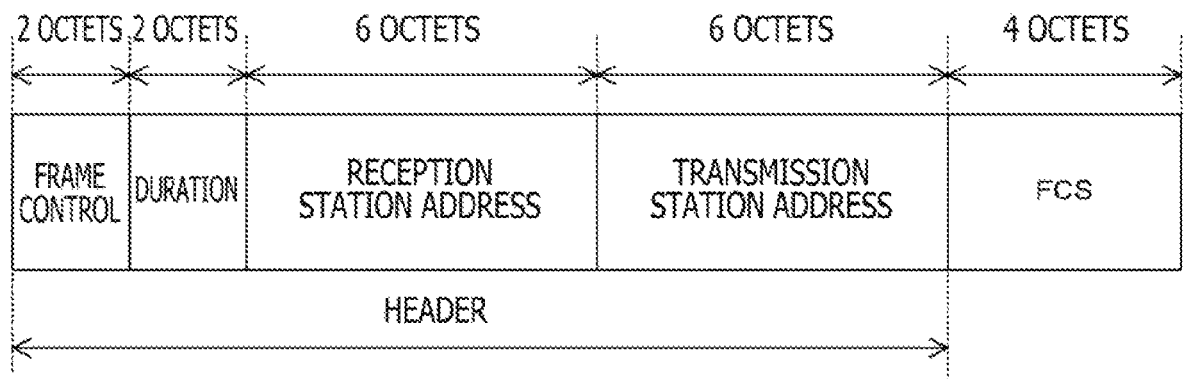
FIG. 6 is a diagram depicting one example of the data structure of an RTS frame according to the first embodiment of the present technique.

Next, the data structure of a frame will be described. The data structure of a frame that is transmitted/received in the communication system conforms to a standard such as the IEEE 802.11ax. FIG. 6 is a diagram depicting one example of the data structure of an RTS frame according to the first embodiment of the present technique. The RTS frame includes a header and an FCS (Frame Check Sequence). The header includes a "frame control" field, a "duration" field, a "reception station address" field, and a "transmission station address" field.

The frame control field includes various control information such as a protocol version, a frame type, and a more fragment.

The duration field includes a duration value indicating a scheduled period to use a wireless channel. A wireless station having received an RTS frame not addressed to the wireless station, refers to the duration value in the frame, and holds, as a NAV expiration time, a time obtained by adding the duration value to the current time (that is, sets a NAV).

The reception station address field includes the MAC address of the reception station (i.e., destination). The transmission station address field includes the MAC address of the transmission station.

The FCS is an error detection code for detecting errors in the header and the frame body.

Figure 7:
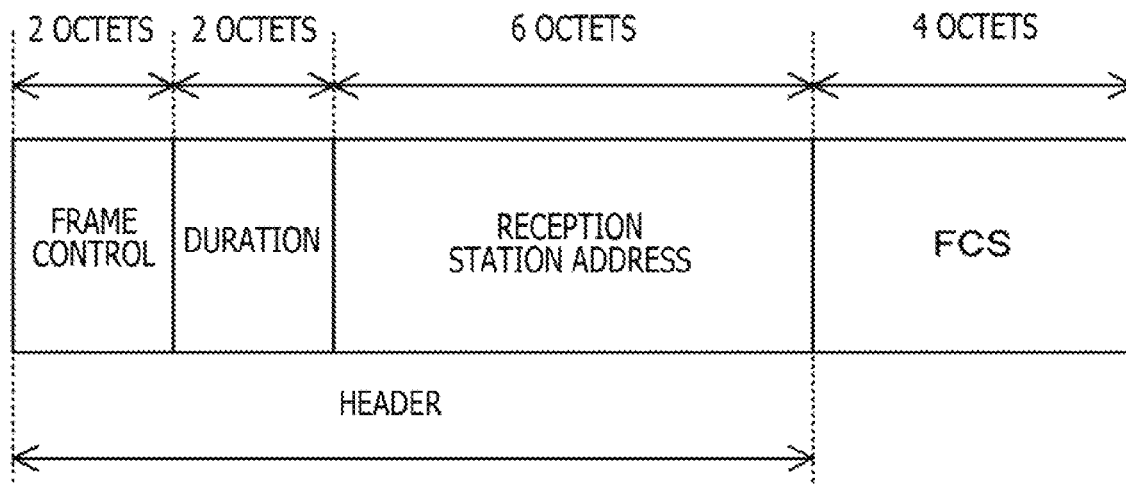
FIG. 7 is a diagram depicting one example of the data frame of a CTS frame according to the first embodiment of the present technique.

FIG. 7 is a diagram depicting one example of the data structure of a CTS frame according to the first embodiment of the present technique. The CTS frame includes a header and an FCS. The header includes a "frame control" field, a "duration" field, and a "reception station address" field.

Figure 8:
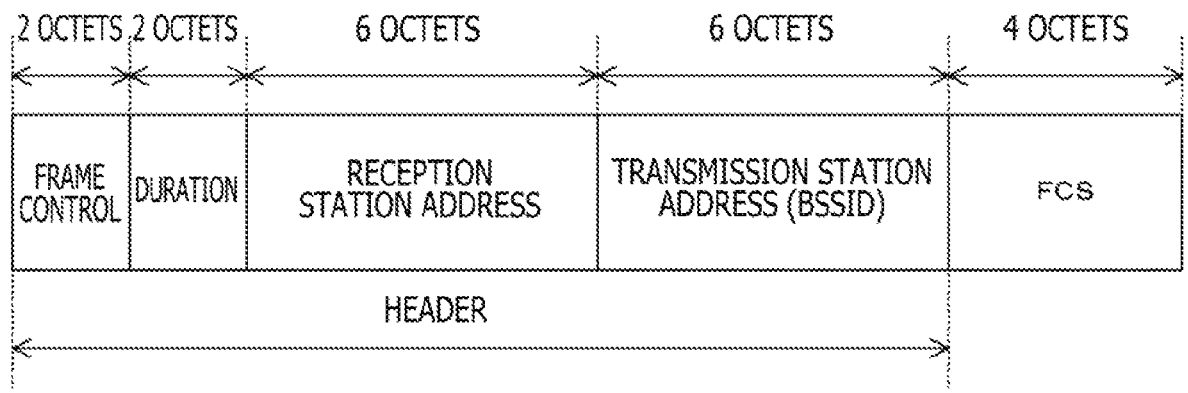
FIG. 8 is a diagram depicting one example of the data structure of a CF-End frame according to the first embodiment of the present technique.

FIG. 8 is a diagram depicting one example of the data structure of a CF-End frame according to the first embodiment of the present technique. The CF-End frame includes a header and an FCS. The header includes a "frame control" field, a "duration" field, a "reception station address" field, and a "transmission station address" field. A BSS ID or the like is used as the "transmission station address."

[Operation Example of Base Station]

Figure 9:
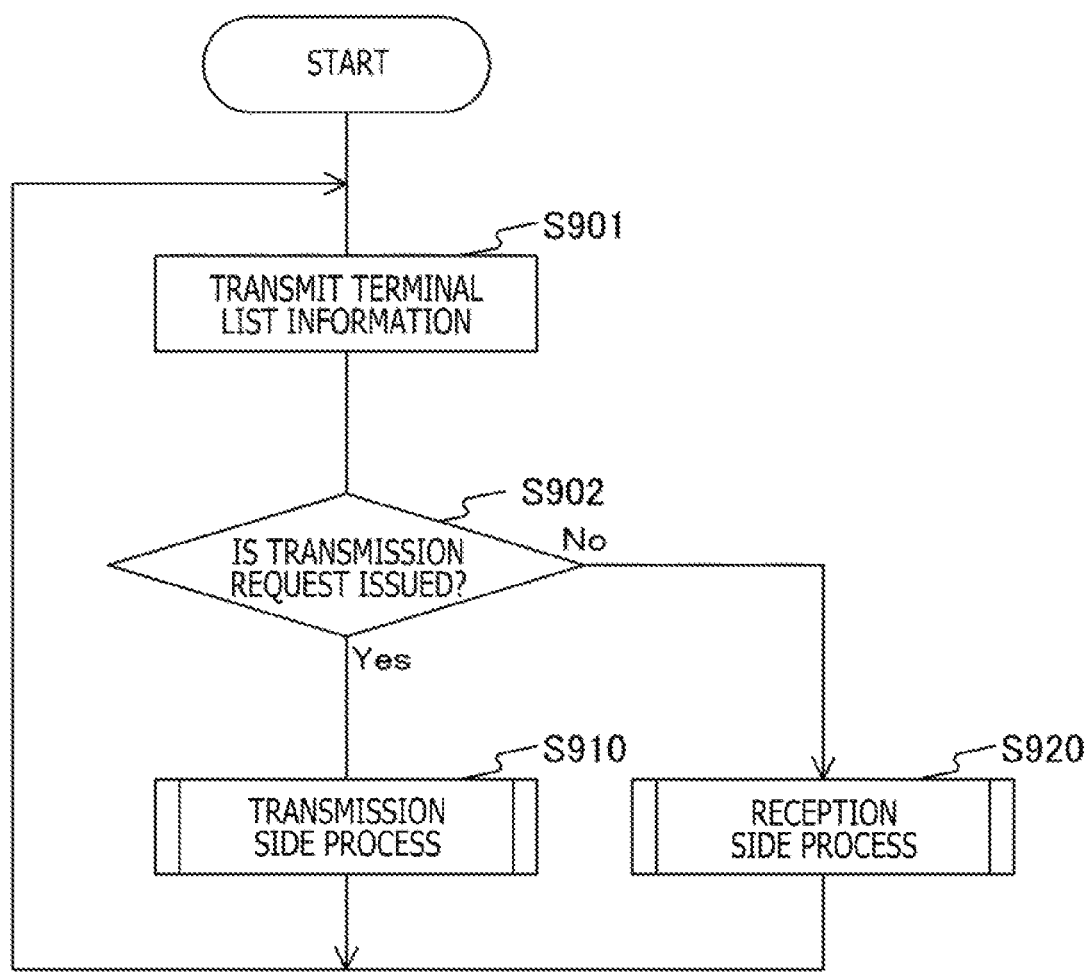
FIG. 9 is a flowchart depicting one example of operation of a base station according to the first embodiment of the present technique.

FIG. 9 is a flowchart depicting one example of operation of the base station 101 according to the first embodiment of the present technique. For example, the base station 101 starts this operation to perform wireless communication. When a wireless terminal is connected or disconnected, the base station 101 transmits terminal list information to all the wireless terminals located in the radio-wave reachable range (step S901).

Then, the base station 101 determines whether or not a request for data transmission is issued at the base station 101 (step S902). In a case where a request for data transmission is issued (step S902: Yes), the base station 101 executes a transmission-side process (step S910) for transmitting data, and repeats step S901 and later steps. Conversely, in a case where no request for data transmission is issued (step S902: No), the base station 101 executes a reception-side process (step S920) for receiving data and setting a NAV, and repeats step S901 and later steps.

Operation of the base stations 102 and 103 other than the base station 101 is similar to that of the base station 101.

Figure 10:
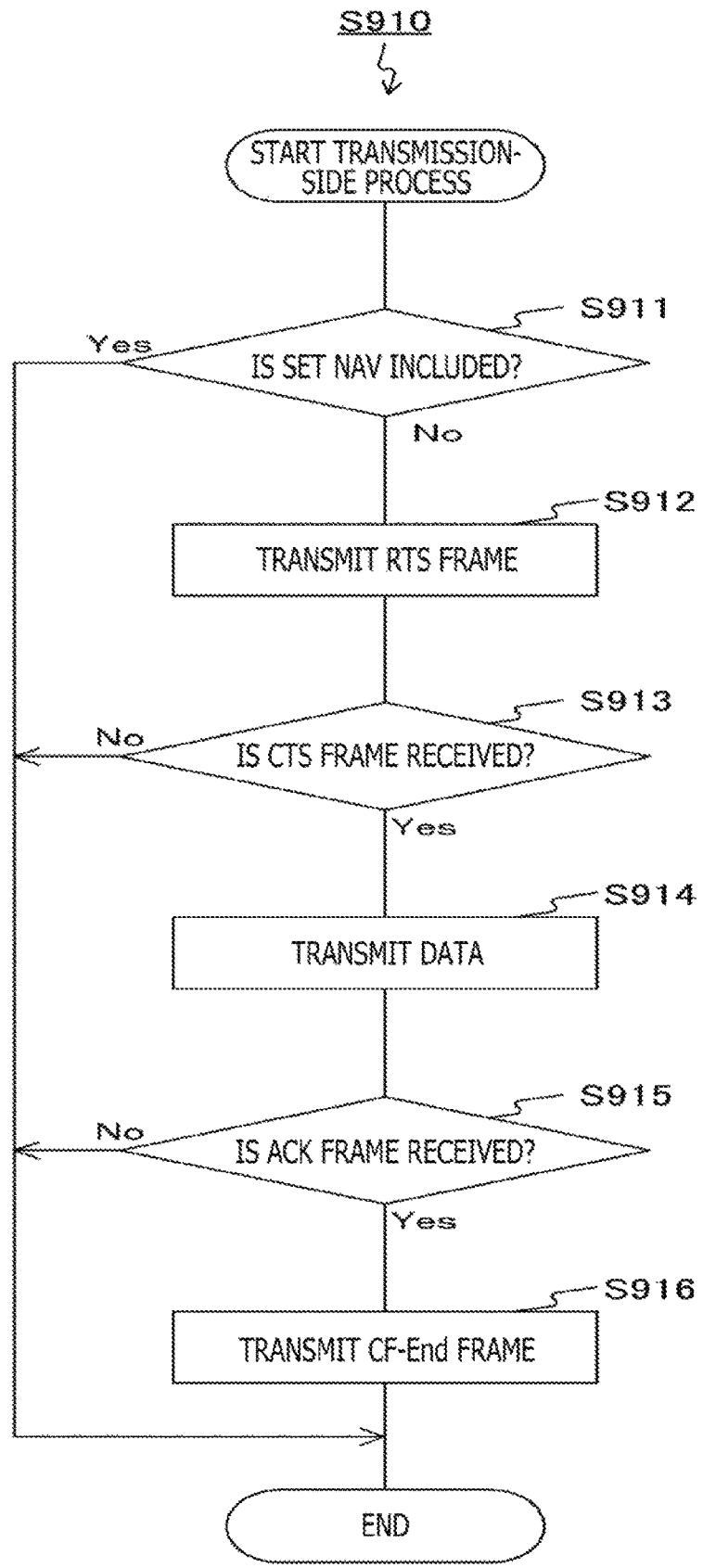
FIG. 10 is a flowchart depicting one example of a transmission-side process according to the first embodiment of the present technique.

FIG. 10 is a flowchart depicting one example of the transmission-side process according to the first embodiment of the present technique. The base station 101 determines whether or not a set NAV is included in the NAV management table 132 (step S911). In a case where a set NAV is not included (step S911: No), the base station 101 generates and transmits an RTS frame (step S912). Subsequently, the base station determines whether or not a CTS frame has been received within a fixed time period (step S913).

In a case where a CTS frame has been received within the fixed time period (step S913: Yes), the base station 101 transmits data on a frame basis (step S914). Subsequently, the base station 101 determines whether or not an ACK frame has been received from the reception station within a fixed time period (step S915).

In a case where an ACK frame has been received within the fixed time period (step S915: Yes), the base station 101 transmits a CF-End frame by broadcasting (step S916).

In a case where a set NAV is included (step S911: Yes) or where no CTS frame has been received within the fixed time period (step S913: No), the base station 101 ends the transmission-side process. Further, also in a case where no ACK frame has been received within the fixed time period (step S915: No) or after step S916, the base station 101 ends the transmission-side process.

Figure 11:
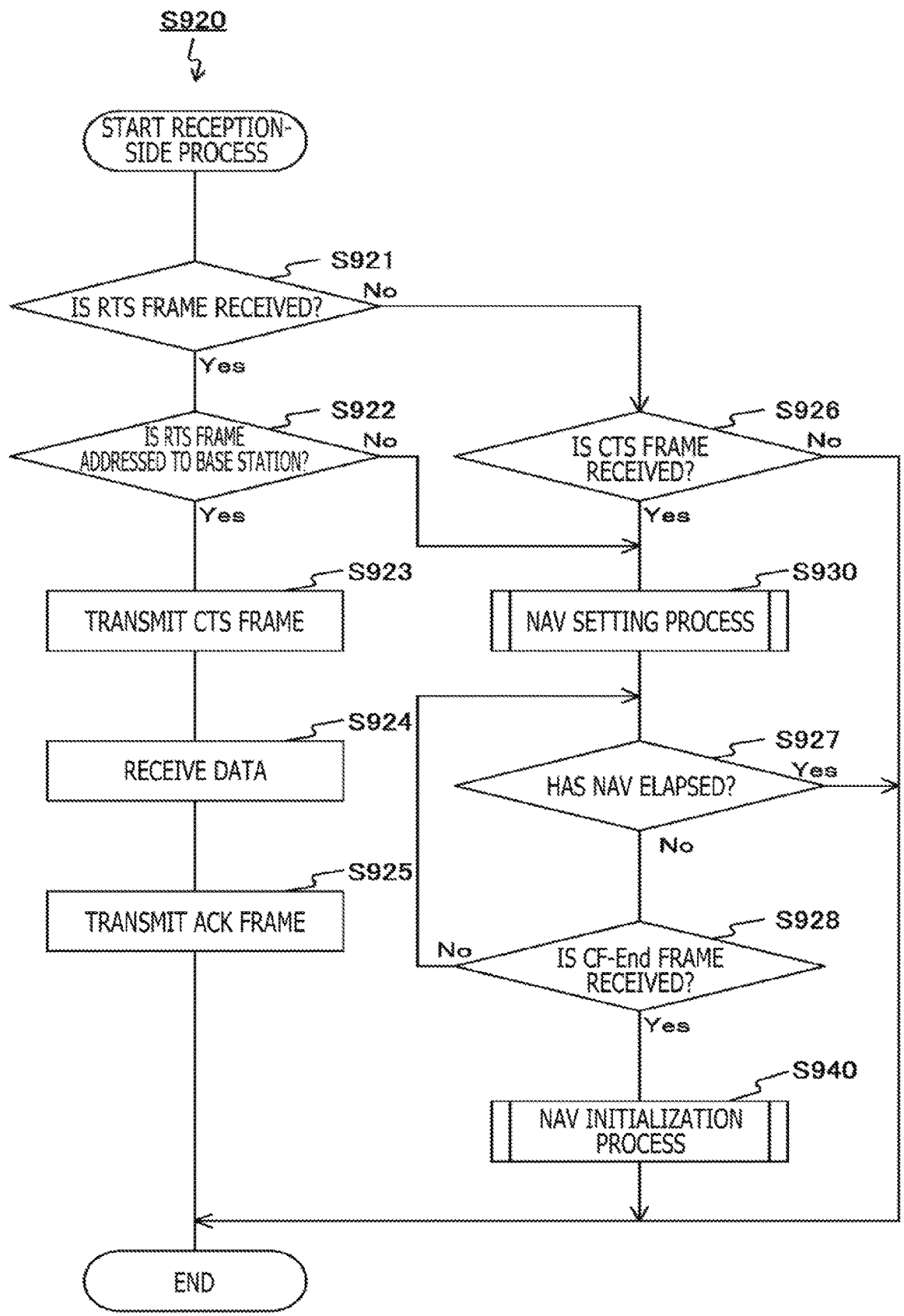
FIG. 11 is a flowchart depicting one example of a reception-side process according to the first embodiment of the present technique.

FIG. 11 is a flowchart depicting one example of the reception-side process according to the first embodiment of the present technique. The base station 101 determines whether or not an RTS frame has been received (step S921). In a case where an RTS frame has been received (step S921: Yes), the base station 101 determines whether or not the RTS frame is addressed to the base station 101, by referring to the header of the frame (step S922).

When the RTS frame is addressed to the base station 101 (step S922: Yes), the base station 101 transmits a CTS frame to the transmission station of the RTS frame (step S923). Then, the base station 101 receives data (step S924). After normally receiving the data, the base station 101 transmits an ACK frame to the transmission station of the data (step S925), and ends the reception-side process.

Also, in a case where no RTS frame has been received (step S921: No), the base station 101 determines whether or not a CTS frame has been received (step S926). When no CTS frame has been received (step S926: No), the base station 101 ends the reception-side process.

In a case where the RTS frame is not addressed to the base station 101 (step S922: No) or where a CTS frame has been received (step S926: Yes), the base station 101 executes a NAV setting process for setting a NAV (step S930).

Then, the base station 101 determines whether or not the expiration time of the NAV has elapsed (step S927). In a case where the expiration time has elapsed (step S927: Yes), the base station 101 initializes the NAV and ends the reception-side process.

In a case where the expiration time has not elapsed (step S927: No), the base station 101 determines whether or not a CF-End frame has been received (step S928). In a case where a CF-End frame has been received (step S928: Yes), the base station 101 executes a NAV initialization process for initializing the NAV (step S940), and ends the reception-side process.

In a case where no CF-End frame has been received (step S928: No), the base station 101 repeats step S927 and later steps.

Figure 12:
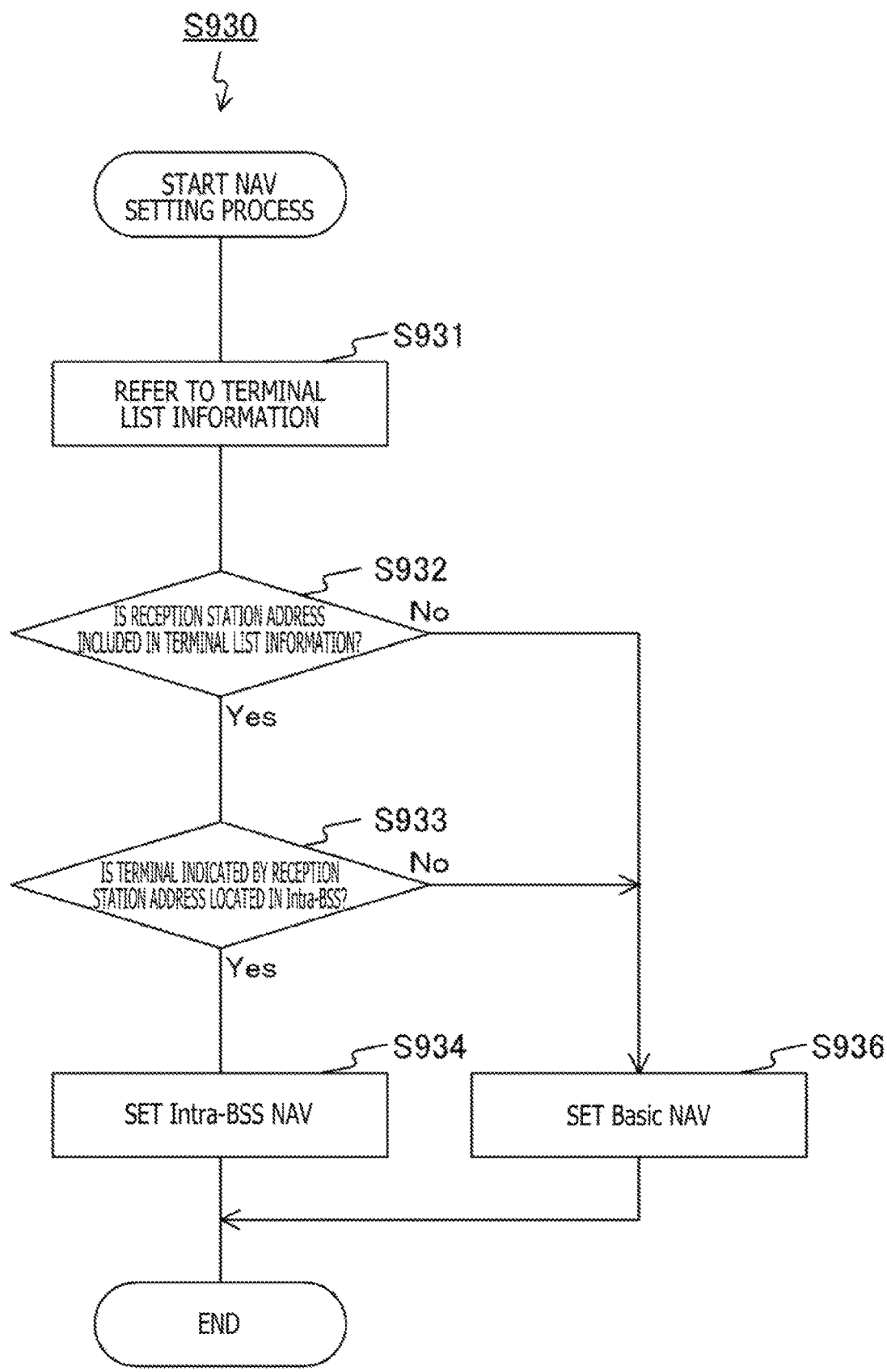
FIG. 12 is a flowchart depicting one example of a NAV setting process according to the first embodiment of the present technique.

FIG. 12 is a flowchart depicting one example of the NAV setting process according to the first embodiment of the present technique. The base station 101 reads and refers to the terminal list information (step S931). The base station 101 determines whether or not the reception station address of the received frame is included in the terminal list information (step S932).

In a case where the reception station address is included in the terminal list information (step S932: Yes), the base station 101 determines whether or not a terminal indicated by the reception station address is a terminal in the Intra-BSS on the basis of the terminal list information (step S933).

In a case where the terminal is a terminal in the Intra-BSS (step S933: Yes), the base station 101 sets an Intra-BSS NAV on the basis of the duration value in the frame (step S934).

In a case where the reception station address is not included in the terminal list information (step S932: No) or where the reception station address does not indicate a terminal in the Intra-BSS (step S933: No), the base station 101 sets a Basic NAV (step S936). After step S934 or S936, the base station 101 ends the NAV setting process.

Figure 13:
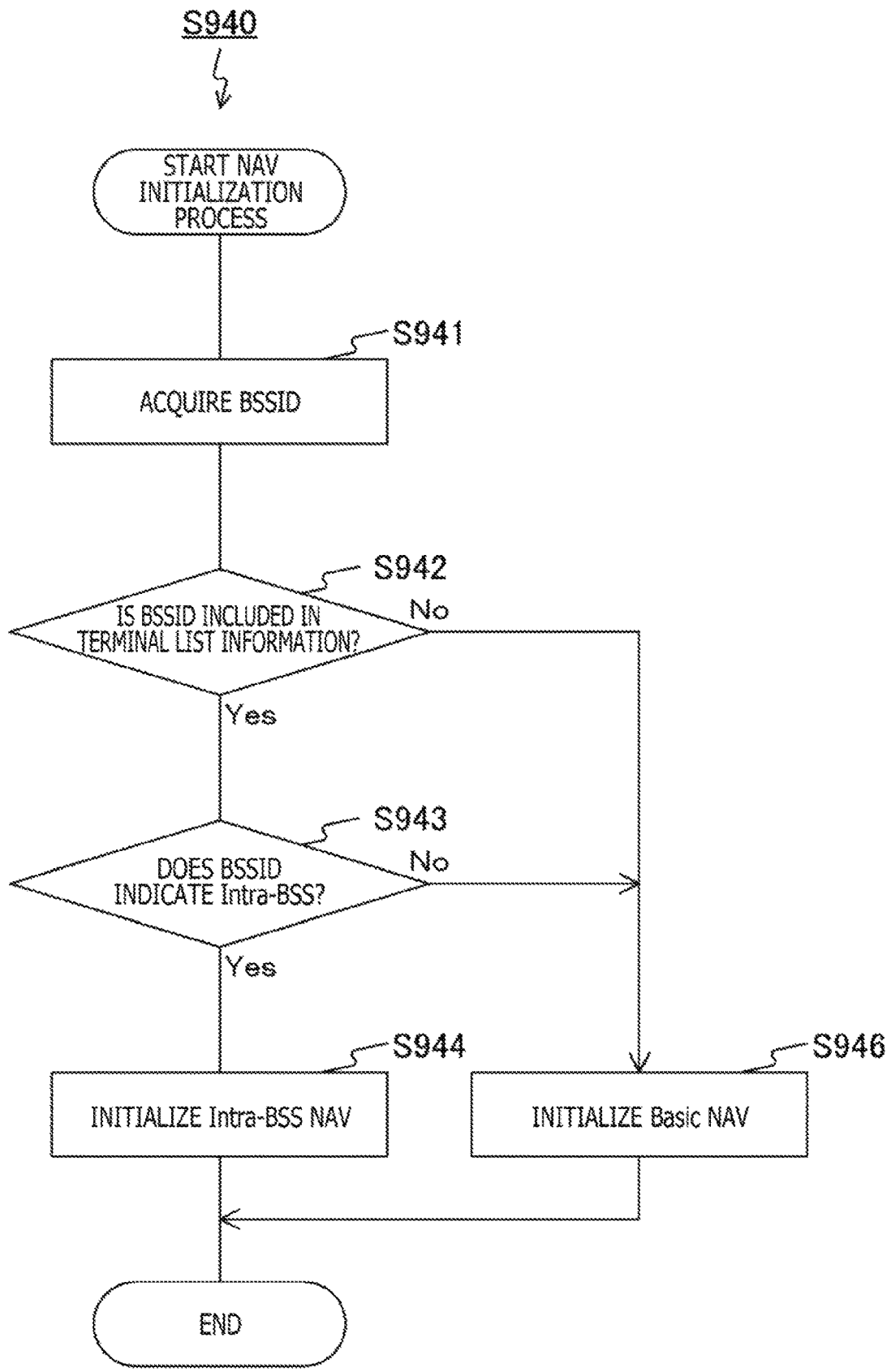
FIG. 13 is a flowchart depicting one example of a NAV initialization process according to the first embodiment of the present technique.

FIG. 13 is a flowchart depicting one example of the NAV initialization process according to the first embodiment of the present technique. The base station 101 acquires the BSS ID from the CF-End frame (step S941). The base station 101 determines whether or not the BSS ID is included in the terminal list information (step S942).

In a case where the BSS ID is included in the terminal list information (step S942: Yes), the base station 101 determines whether or not the acquired BSS ID indicates the Intra-BSS (step S943). In a case where the BSS ID indicates the Intra-BSS (step S943: Yes), the base station 101 initializes the Intra-BSS NAV (step S944).

In a case where the BSS ID is not included in the terminal list information (step S942: No) or where the BSS ID does not indicate the Intra-BSS (step S943: No), the base station 101 initializes the Basic NAV (step S946). After step S944 or S946, the base station 101 ends the NAV initialization process.

[Operation Example of Wireless Terminal]

Figure 14:
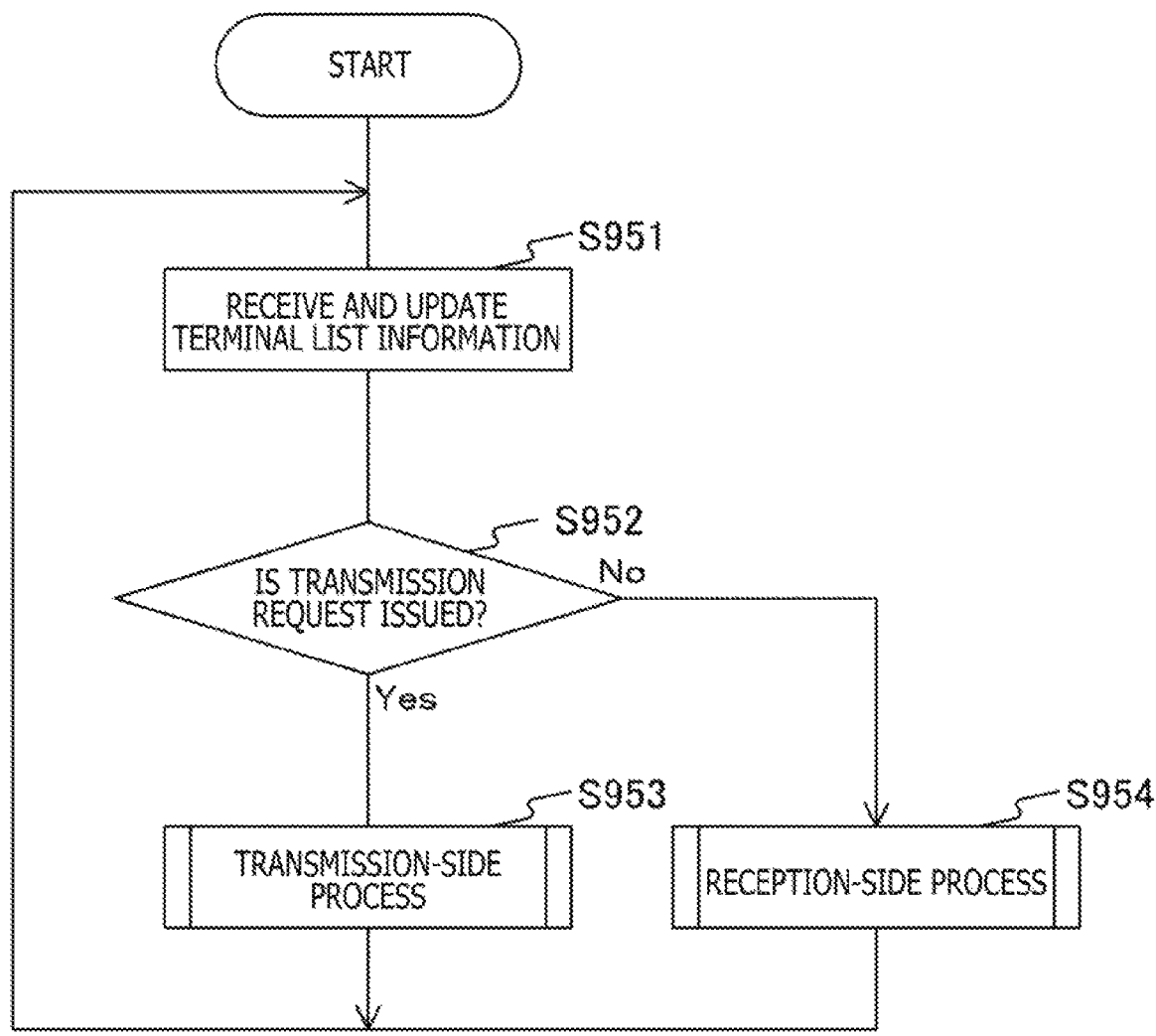
FIG. 14 is a flowchart depicting one example of operation of a wireless terminal according to the first embodiment of the present technique.

FIG. 14 is a flowchart depicting one example of operation of the wireless terminal 201 according to the first embodiment of the present technique. For example, this operation is started when the wireless terminal 201 is connected to the base station 101. First, the wireless terminal 201 receives and holds terminal list information (step S951). In a case where reception of terminal list information at step S951 is the second or later time, the wireless terminal 201 updates the terminal list information by using the new received information.

Subsequently, the wireless terminal 201 determines whether or not a request for data transmission is issued at the wireless terminal 201 (step S952). In a case where a request for data transmission is issued (step S952: Yes), the wireless terminal 201 executes a transmission-side process (step S953) for transmitting data, and repeats step S951 and later steps. Conversely, in a case where no request for data transmission is issued (step S952: No), the wireless terminal 201 executes a reception-side process (step S954) for receiving data or setting a NAV, and repeats step S951 and later steps.

The processes of steps S953 and S954 at the wireless terminal 201 are similar to those of steps S910 and S920 at the base station side. Also, operation of each of the wireless terminals 202 to 205 other than the wireless terminal 201 is similar to that of the wireless terminal 201.

Figure 15:
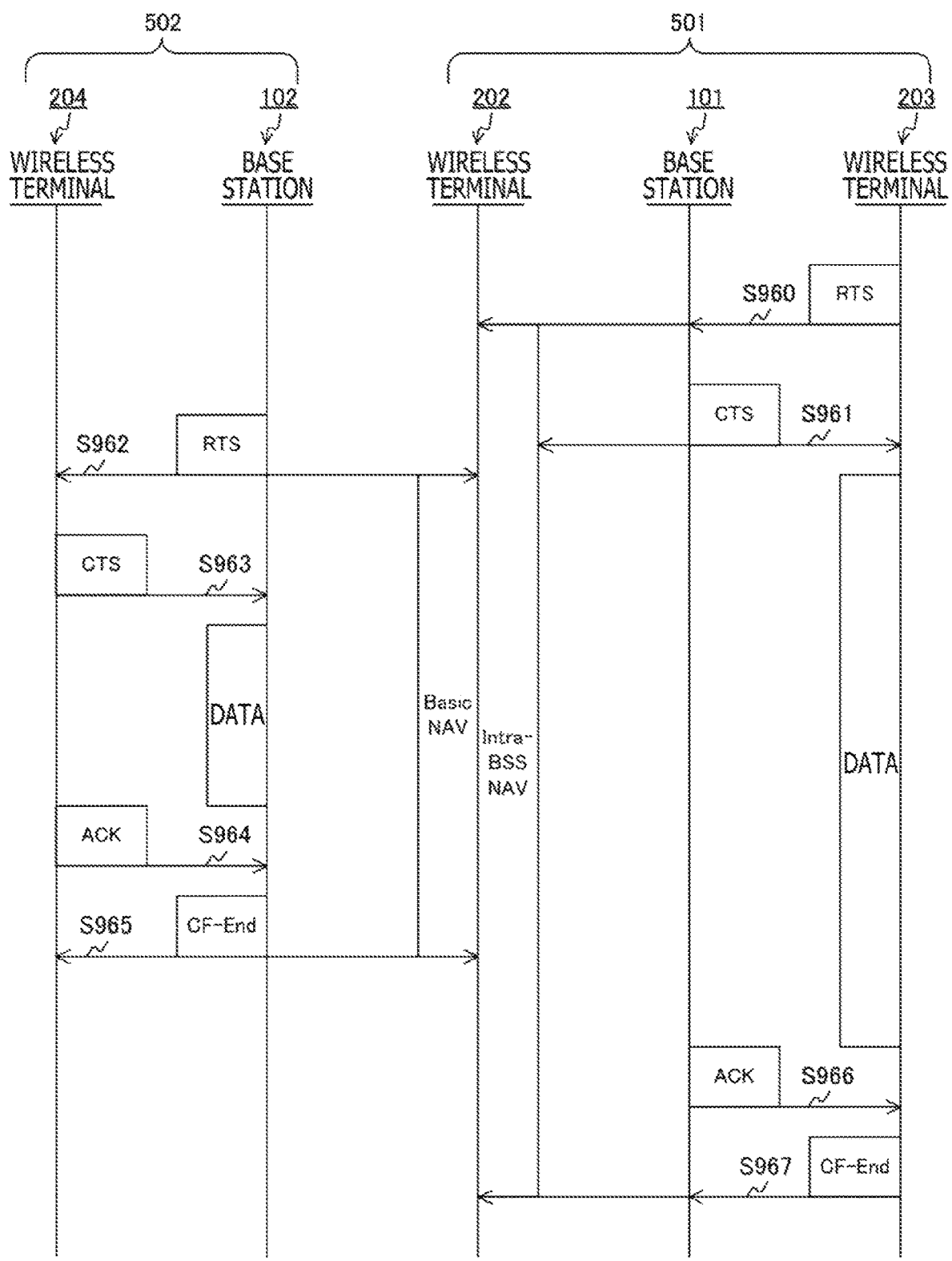
FIG. 15 is a sequence diagram depicting one example of RTS/CTS flow control in which no frame collision occurs in a comparative example.

FIG. 15 is a sequence diagram depicting one example of RTS/CTS flow control that does not involve occurrence of a frame collision in a comparative example in which no terminal list information is transmitted and received. As the comparative example, a communication system that performs communication in accordance with the public information scheme of the IEEE 802.11ax standard, without transmitting/receiving any terminal list information, is assumed. In the comparative example, it is assumed that the BSS 501 includes the base station 101 and the wireless terminals 202 and 203 while the BSS 502 includes the base station 102 and the wireless terminal 204. The wireless terminal 203 in the BSS 501 transmits an RTS frame to the base station 101 (step S960). The wireless terminal 202 is assumed to be able to receive the RTS frame.

Both the transmission station address and the reception station address are included in an RTS frame, as depicted in FIG. 6. In either a case where a base station transmits an RTS frame or a case where a wireless terminal transmits an RTS frame, either one of the transmission station and the reception station necessarily serves as the base station. Thus, the wireless terminal 202 can determine whether or not a wireless station (transmission station or reception station) related to the RTS frame is located in the Intra-BSS. In the case of FIG. 15, the transmission station of the RTS frame is the base station 101 in the Intra-BSS. Therefore, the wireless terminal 202 sets an Intra-BSS NAV on the basis of the duration value in the frame.

Then, the base station 101 returns a CTS frame to the wireless terminal 203 (step S961). The wireless terminal 203 having received the CTS frame starts data transmission.

Meanwhile, after the CTS frame is transmitted, the base station 102 transmits an RTS frame to the wireless terminal 204 (step S962). The wireless terminal 202 is assumed to be able to receive the RTS frame. A BSS to which the transmission station in the RTS frame belongs is the BSS 502 which is external to the Intra-BSS. Therefore, the wireless terminal 202 sets a Basic NAV on the basis of the duration value in the frame.

The wireless terminal 204 having received the RTS frame returns a CTS frame to the base station 102 (step S963). The base station 102 having received the CTS frame starts data transmission. When normally receiving the data, the wireless terminal 204 transmits an ACK frame to the base station 102 (step S964). The base station 102 broadcasts an CF-End frame (step S965).

A CF-End frame includes a BSS ID, as depicted in FIG. 8. Accordingly, a wireless station having received a CF-End frame can determine whether or not a wireless station related to the CF-End frame is located in the Intra-BSS. In the case of FIG. 15, the transmission station of the CF-End frame is the base station 102 which is external to the Intra-BSS. Therefore, the wireless terminal 202 having received the CF-End frame considers that communication outside the Intra-BSS is completed, and initializes the Basic NAV.

When, after initialization of the Basic NAV, data transmission performed by the wireless terminal 203 is completed and the data is normally received, the base station 101 transmits an ACK frame to the wireless terminal 203 (step S966). The wireless terminal 203 broadcasts a CF-End frame (step S967).

The wireless terminal 202 having received the CF-End frame considers that communication in the Intra-BSS is completed, and initializes the Intra-BSS NAV.

In the Two NAV scheme, an Intra-BSS NAV and a Basic NAV are separately set, as described above. In the aforementioned case, even when the Basic NAV is initialized by the CF-End frame from the base station 102 at step S965, the Intra-BSS NAV is still in the set state at this time point. Accordingly, while the wireless terminal 203 is transmitting data, the wireless terminal 202 starts transmission, so that a situation where a frame collision occurs can be avoided.

According to this scheme of the comparative example, frame collisions can be avoided to a certain extent, but a frame collision may occur in a certain case because no terminal list information is transmitted/received.

Figure 16:
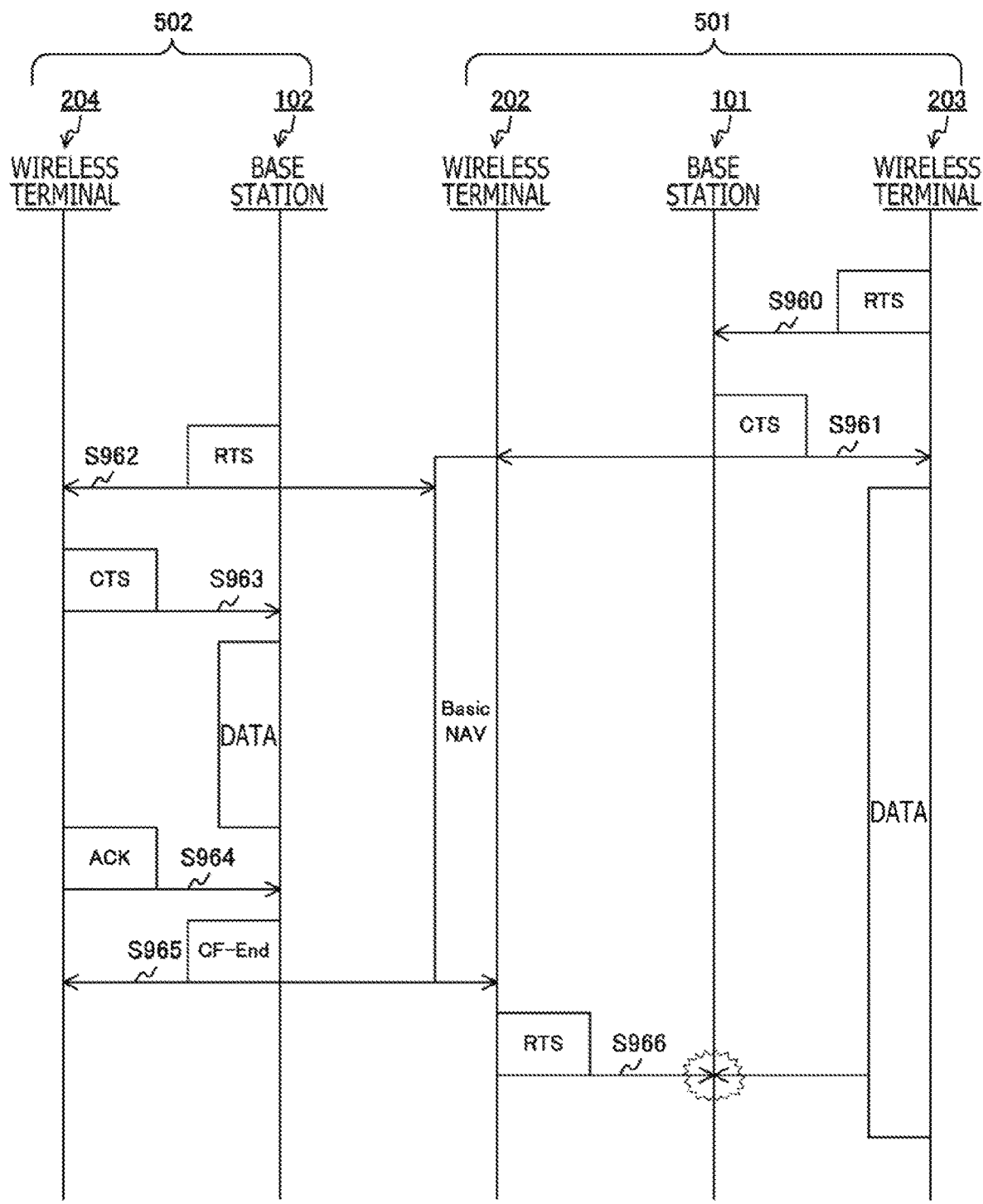
FIG. 16 is a sequence diagram depicting one example of RTS/CTS flow control in which a frame collision occurs in a comparative example.

FIG. 16 is a sequence diagram depicting one example of RTS/CTS flow control that involves occurrence of a frame collision in a comparative example in which no terminal list information is transmitted and received. The configuration of a communication system is assumed to be similar to that in FIG. 1. The wireless terminal 203 in the BSS 501 transmits an RTS frame to the base station 101 (step S960).

Here, unlike the case in FIG. 15, the wireless terminal 202 in FIG. 16 is assumed to be unable to receive the RTS frame from the wireless terminal 203. For example, an obstacle existing between the wireless terminals 202 and 203 or a long distance between these terminals are considered to cause the wireless terminal 202 to be unable to receive the RTS frame. The wireless terminal 203 is a hidden terminal to the wireless terminal 202.

The base station 101 having received the RTS frame returns a CTS frame to the wireless terminal 203 (step S961). The wireless terminal 202 is assumed to be able to receive the CTS frame.

A CTS frame includes a reception station address (i.e., the address of the wireless terminal 203), but does not include a transmission station address, as depicted in FIG. 7. The wireless terminal 202 of the comparative example has not received any terminal list information, and thus, cannot determine whether or not the destination of the CTS frame is located in the Intra-BSS. The public information of the IEEE 802.11ax specifies setting of a Basic NAV for such a case. Thus, the wireless terminal 202 erroneously sets a Basic NAV although the wireless terminal 203 which is the destination of the CTS frame is located in the Intra-BSS.

Thereafter, when the base station 102 transmits a CF-End frame (step S965), the wireless terminal 202 initializes the Basic NAV. As a result of initialization of the Basic NAV, the wireless terminal 202 enters a state of being allowed to transmit data, and transmits an RTS frame (step S966). Since the wireless terminal 203 is under communication at this point, a frame collision occurs.

The reason that a frame collision occurs in this case is that the wireless terminal 202 is unable to receive an RTS frame from a hidden terminal, and thus, erroneously sets a NAV on the basis of the CTS frame transmitted at step S961. Therefore, in order to appropriately set a NAV on the basis of a CTS frame, a base station and wireless terminals share terminal list information by transmission/reception in the communication system according to the first embodiment of the present technique.

Figure 17:
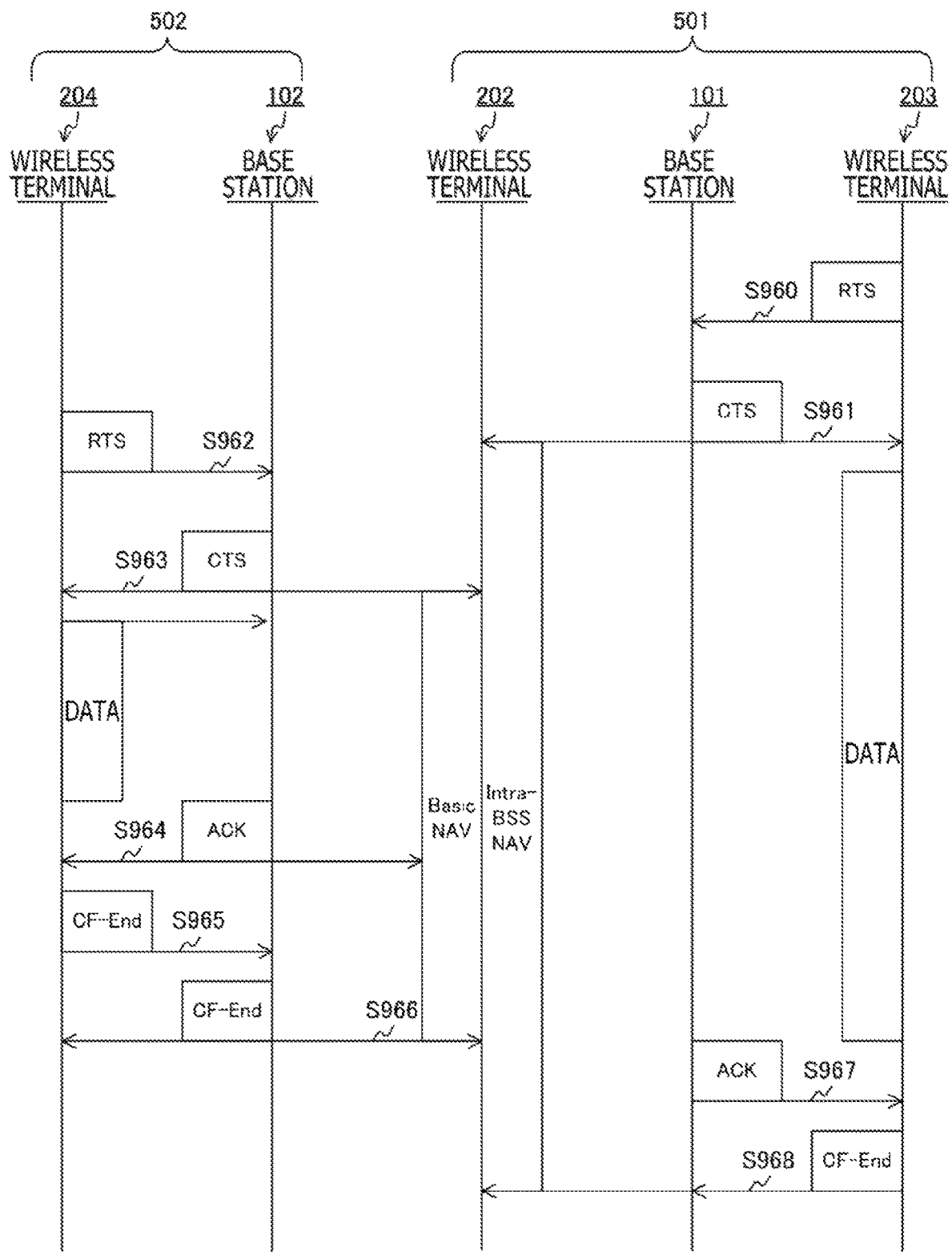
FIG. 17 is a sequence diagram depicting one example of RTS/CTS flow control after transmission/reception of terminal list information according to the first embodiment of the present technique.

FIG. 17 is a sequence diagram depicting one example of RTS/CTS flow control subsequent to transmission/reception of terminal list information according to the first embodiment of the present technique. The configuration of the communication system in FIG. 17 is assumed to be similar to that in FIG. 15. The wireless terminal 203 in the BSS 501 transmits an RTS frame to the base station 101 (step S960).

In FIG. 17, the wireless terminal 202 is assumed to be unable to receive the RTS frame from the wireless terminal 203, as in FIG. 16. The base station 101 having received the RTS frame returns a CTS frame to the wireless terminal 203 (step S961). The wireless terminal 202 is assumed to be able to receive the CTS frame.

The wireless terminal 203 determines whether or not the destination (i.e., wireless terminal 203) of the CTS frame is a terminal in the Intra-BSS, by referring to the terminal list information. In the terminal list information, the MAC addresses in the BSS are written in association with the BSS ID of the Intra-BSS. Therefore, the wireless terminal 203 can correctly determine that the wireless terminal 203 is a terminal in the Intra-BSS, by referring to the terminal list information. Accordingly, the wireless terminal 202 sets an Intra-BSS NAV.

Then, when receiving the CTS frame from the base station 102 (step S963), the wireless terminal 202 appropriately sets a Basic NAV by referring to the terminal list information. Thereafter, when the base station 102 transmits a CF-End frame (step S966), the wireless terminal 202 initializes the Basic NAV.

As a result of appropriate setting of the Intra-BSS NAV at step S961, even when the CF-End frame is received at step S966, the Intra-BSS NAV remains in the set state. Therefore, the wireless terminal 202 does not start data transmission when the wireless terminal 203 which is a hidden terminal is transmitting data, so that frame collisions can be avoided.

As described above, according to the first embodiment of the present technique, a wireless terminal receives terminal list information including the addresses in a BSS, and appropriately sets a NAV on the basis of the information. Therefore, frame collisions due to erroneous setting of a NAV can be prevented.

2. Second Embodiment

In the aforementioned first embodiment, the wireless terminal 201 etc., sets an Intra-BSS NAV or a Basic NAV on the basis of a terminal information list. As a result, frame collisions can be avoided to a practically sufficient extent. However, even in this case, a frame collision may occur.

Figure 18:
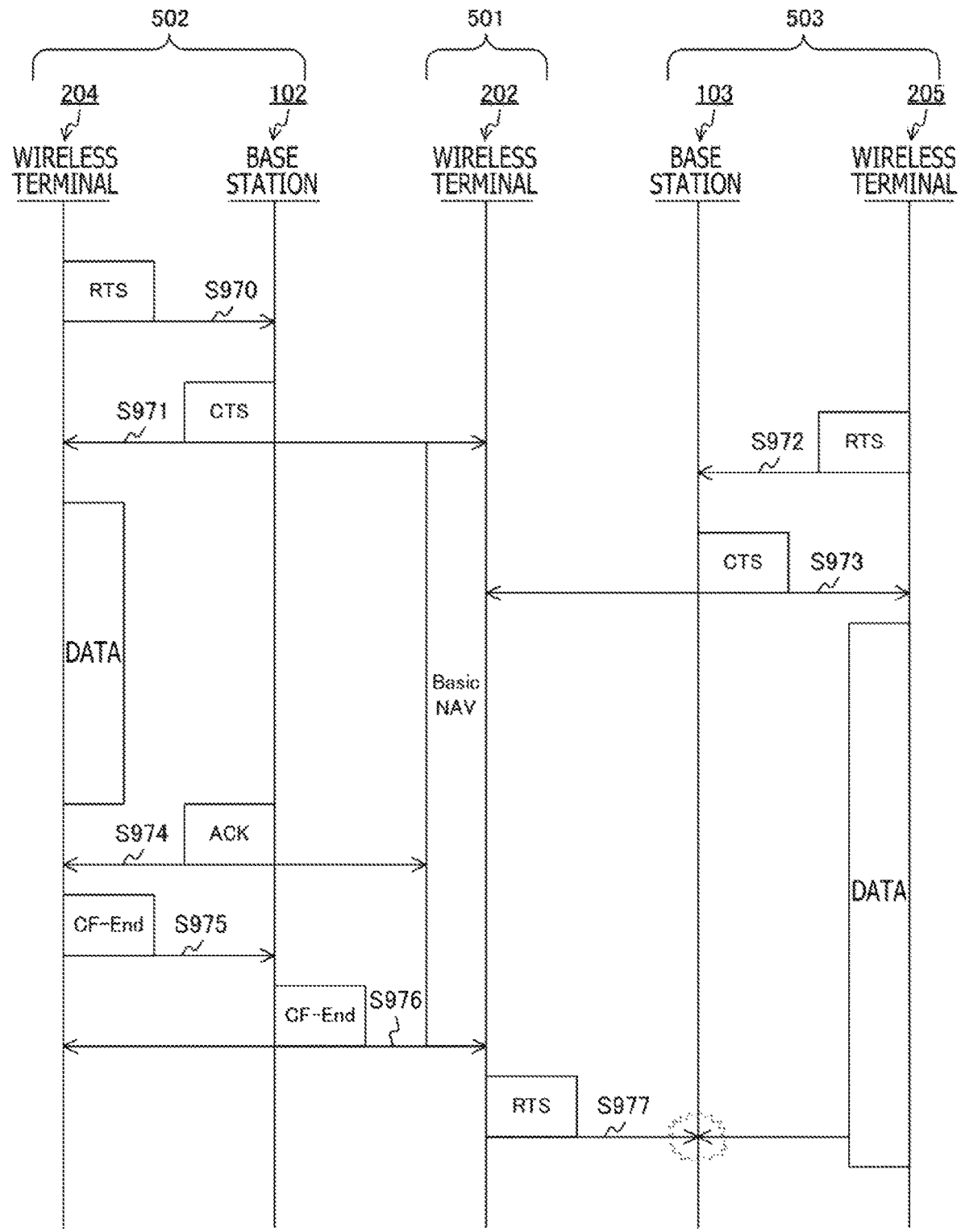
FIG. 18 is a sequence diagram depicting one example of flow control in which a frame collision occurs according to the first embodiment of the present technique.

FIG. 18 is a sequence diagram depicting one example of flow control that involves occurrence of a frame collision in the communication system according to the first embodiment of the present technique. The wireless terminal 202 is assumed to be connected to the BSS 501, and the BSS 502 is assumed to include the base station 102 and the wireless terminal 204. Also, the BSS 503 is assumed to include the base station 103 and the wireless terminal 205.

The wireless terminal 204 transmits an RTS frame to the base station 102 (step S970). The wireless terminal 202 is assumed to be unable to receive the RTS frame.

The base station 102 having received the RTS frame returns a CTS frame to the wireless terminal 204 (step S971). The wireless terminal 202 is assumed to be able to receive the CTS frame. The wireless terminal 202 sets a Basic NAV by referring to the terminal list information.

Meanwhile, the wireless terminal 205 transmits an RTS frame to the base station 103 (step S972). The wireless terminal 202 is assumed to be unable to receive the RTS frame.

The base station 103 having received the RTS frame returns a CTS frame to the wireless terminal 205 (step S973). The wireless terminal 202 is assumed to be able to receive the CTS frame. When a time obtained by adding the current time to the duration value in the CTS frame is longer than the expiration time of the set Basic NAV, the Basic NAV is updated.

Then, when data transmission by the wireless terminal 204 is completed, the base station 102 transmits an ACK frame to the wireless terminal 204 (step S974), and the wireless terminal 204 broadcasts a CF-End frame (step S975). The wireless terminal 202 is unable to receive the CF-End frame, as in step S970.

The base station 102 having received the CF-End frame broadcasts a CF-End frame (step S976). The wireless terminal 202 receives the CF-End frame and initializes the Basic NAV because the BSS ID does not indicate the Intra-BSS.

As a result of initialization of the Basic NAV, the wireless terminal 202 enters a state of being allowed to transmit data, and transmits an RTS frame (step S977). Since the wireless terminal 205 is under communication at this point, a frame collision may occur. Thus, when the number of external BSSs is two or more, a Basic NAV is inappropriately initialized, so that a frame collision may occur. The communication system according to the second embodiment differs from that of the first embodiment in that the communication system prevents frame collisions when the number of external BSSs is two or more.

FIG. 19 is a diagram depicting one configuration example of a NAV management table 133 according to the second embodiment of the present technique. In the second embodiment, the base station 101 holds the NAV management table 133, instead of the NAV management table 132 of the first embodiment. The same applies to the wireless terminal 201 etc.

The NAV management table 133 according to the second embodiment differs from that of the first embodiment in that an Inter-BSS NAV is further set. An Inter-BSS NAV is a period set for each BSS ID external to the Intra-BSS, among BSS IDs in the terminal list information. Until the expiration time of the Inter-BSS NAV elapses or until communication of the corresponding BSS is completed (a CF-End frame is received), data transmission is prohibited. Note that an Inter-BSS NAV is one example of the inter-network transmission prohibition period set forth in the claims.

Thus, in addition to an Intra-BSS NAV and a Basic NAV, an Inter-BSS NAV is further set, so that, as depicted in FIG. 18, a situation in which frames collide with each other can be avoided when the number of external BSSs is two or more.

Also, in the NAV management table 133, a BSS ID and an expiration time are written in association with each other for each NAV. When receiving an RTS frame or a CTS frame, the base station 101 determines whether or not the NAV corresponding to a terminal related to the frame is set in the NAV management table 133. In a case where the NAV is not set, the base station 101 adds the NAV in the NAV management table 133.

Here, in a case where the MAC address related to the frame is included in the terminal list information, an Intra-NAV or Inter-BSS NAV including the corresponding BSS ID and the expiration time is set. Conversely, in a case where the MAC address related to the frame is not included in the terminal list information, a Basic NAV including an invalid value (NULL value or the like) and an expiration time is set.

For example, it is assumed that the respective BSS IDs of the BSSs 501 to 503 are included in the terminal list information and that the BSS 501 is an Intra-BSS. In a case where a MAC address related to a received frame is included in the terminal information list and the BSS corresponding to the MAC address is the BSS 501, an Intra-BSS NAV is set.

Alternatively, in a case where a MAC address related to a received frame is included in the terminal information list and the BSS corresponding to the MAC address is the external BSS 502 or BSS 503, an Inter-BSS NAV is set. In a case where a MAC address related to a received frame is not included in the terminal information list, a Basic NAV is set.

Then, the base station 101 is allowed to start data transmission when all the NAVs have been elapsed or after initialization of all the NAVs. For example, even when two Inter-NAVs are set and only one of the Inter-NAVs is initialized, data transmission is prohibited until the other Inter-NAV is initialized.

Note that, although the base station 101 sets an Inter-BSS NAV for each of the BSS IDs of the external BSSs, the configuration is not limited to this. For example, in a case where the number of external adjacent BSSs is small or in a case where the case in FIG. 18 is rare, the base station 101 may set one Inter-BSS NAV for the external BSSs without managing the external BSSs on the BSS ID basis.

Figure 20:
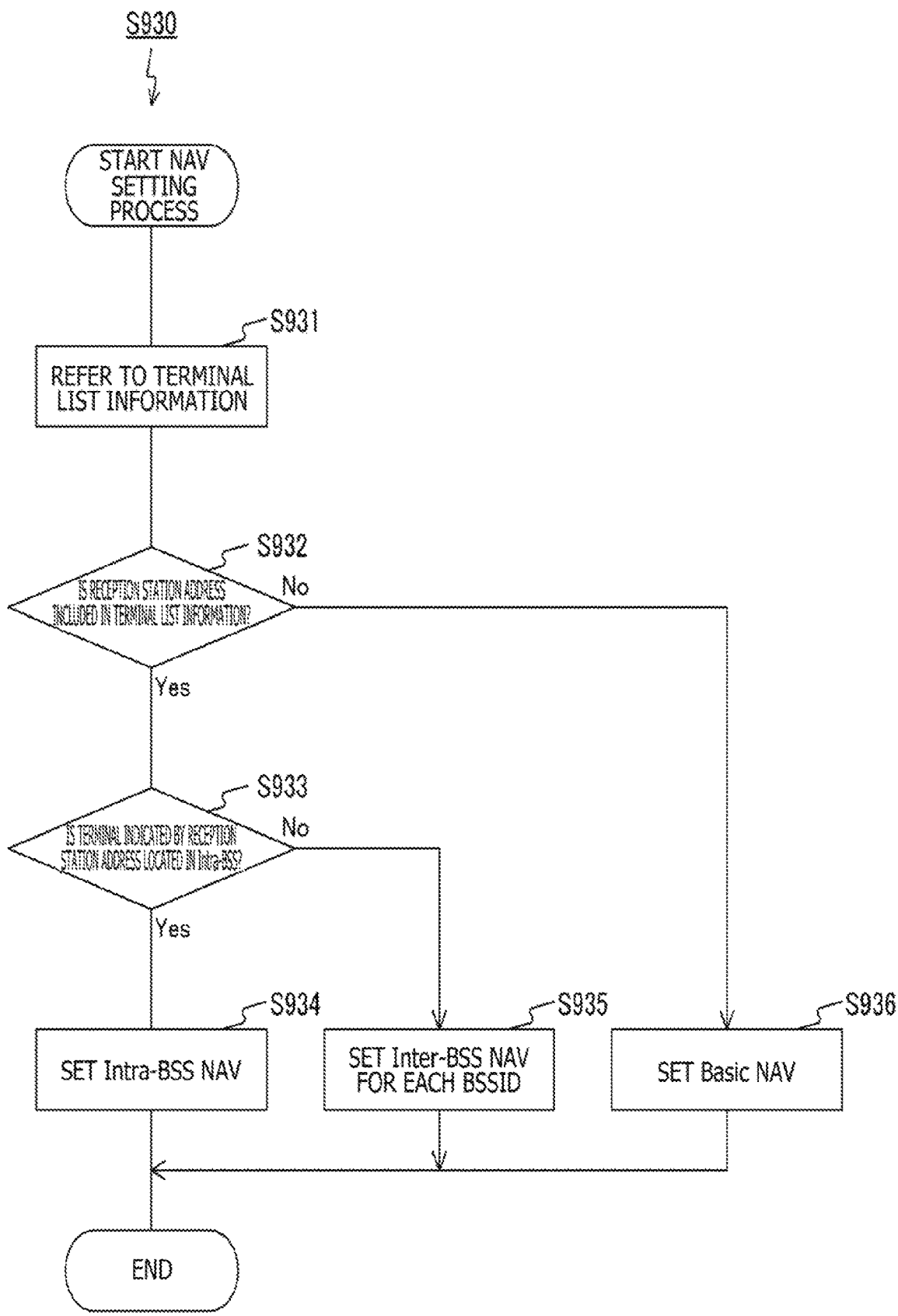
FIG. 20 is a flowchart depicting one example of a NAV setting process according to the second embodiment of the present technique.

FIG. 20 is a flowchart depicting one example of the NAV setting process according to the second embodiment of the present technique. The NAV setting process according to the second embodiment differs from that of the first embodiment in that step S935 is further executed.

In a case where a terminal indicated by the reception station address is not a terminal in the Intra-BSS (step S933: No), the base station 101 sets an Inter-BSS NAV for each of the BSS IDs (step S935), and ends the NAV setting process.

Figure 21:
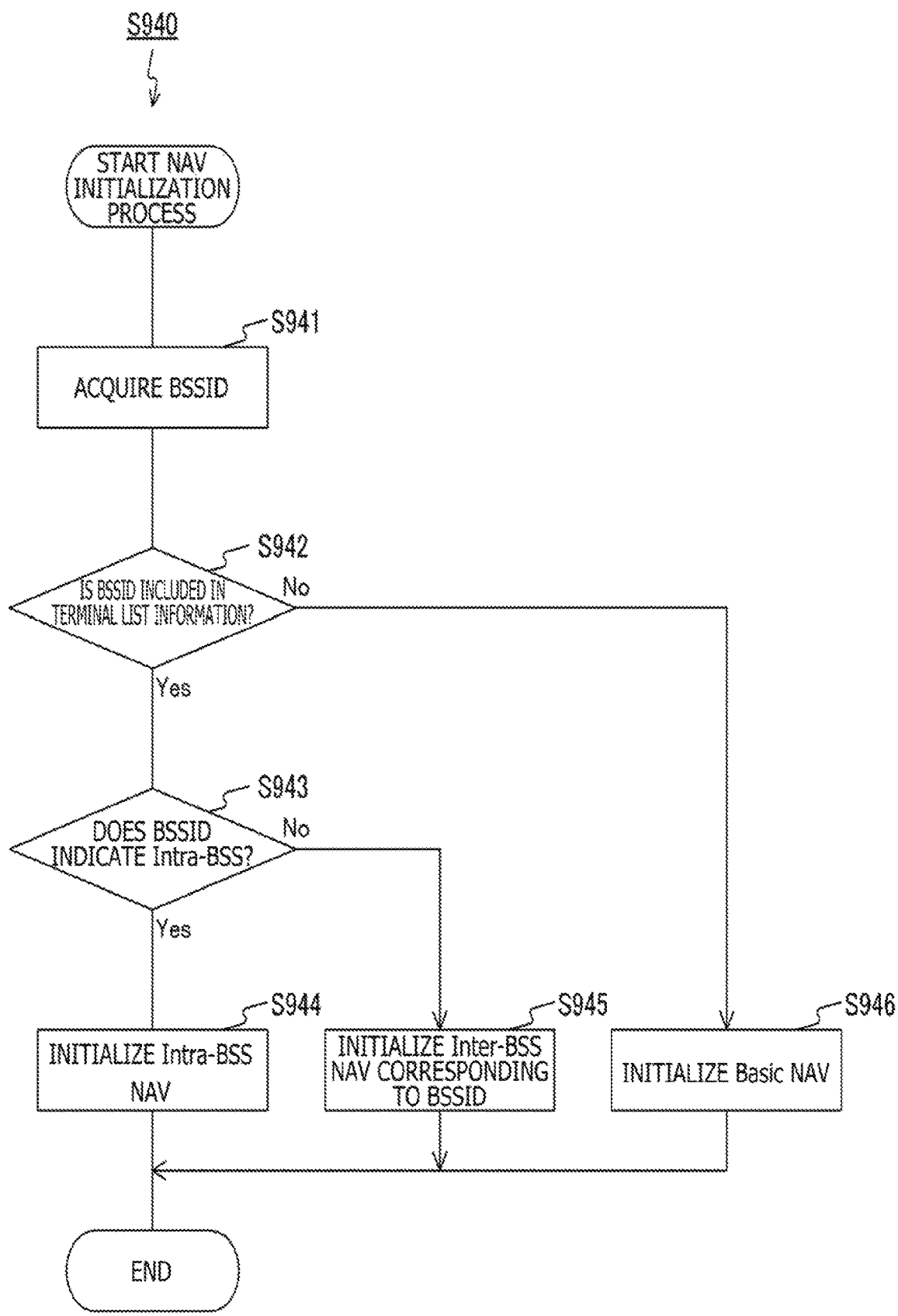
FIG. 21 is a flowchart depicting one example of a NAV initialization process according to the second embodiment of the present technique.

FIG. 21 is a flowchart depicting one example of the NAV initialization process according to the second embodiment of the present technique. The NAV initialization process according to the second embodiment differs from that of the first embodiment in that step S945 is further executed.

In a case where an acquired BSS ID indicates a BSS outside the Intra-BSS (step S943: No), the base station 101 initializes the Inter-BSS NAV corresponding to the BSS ID (step S945), and ends the NAV initialization process.

Figure 22:
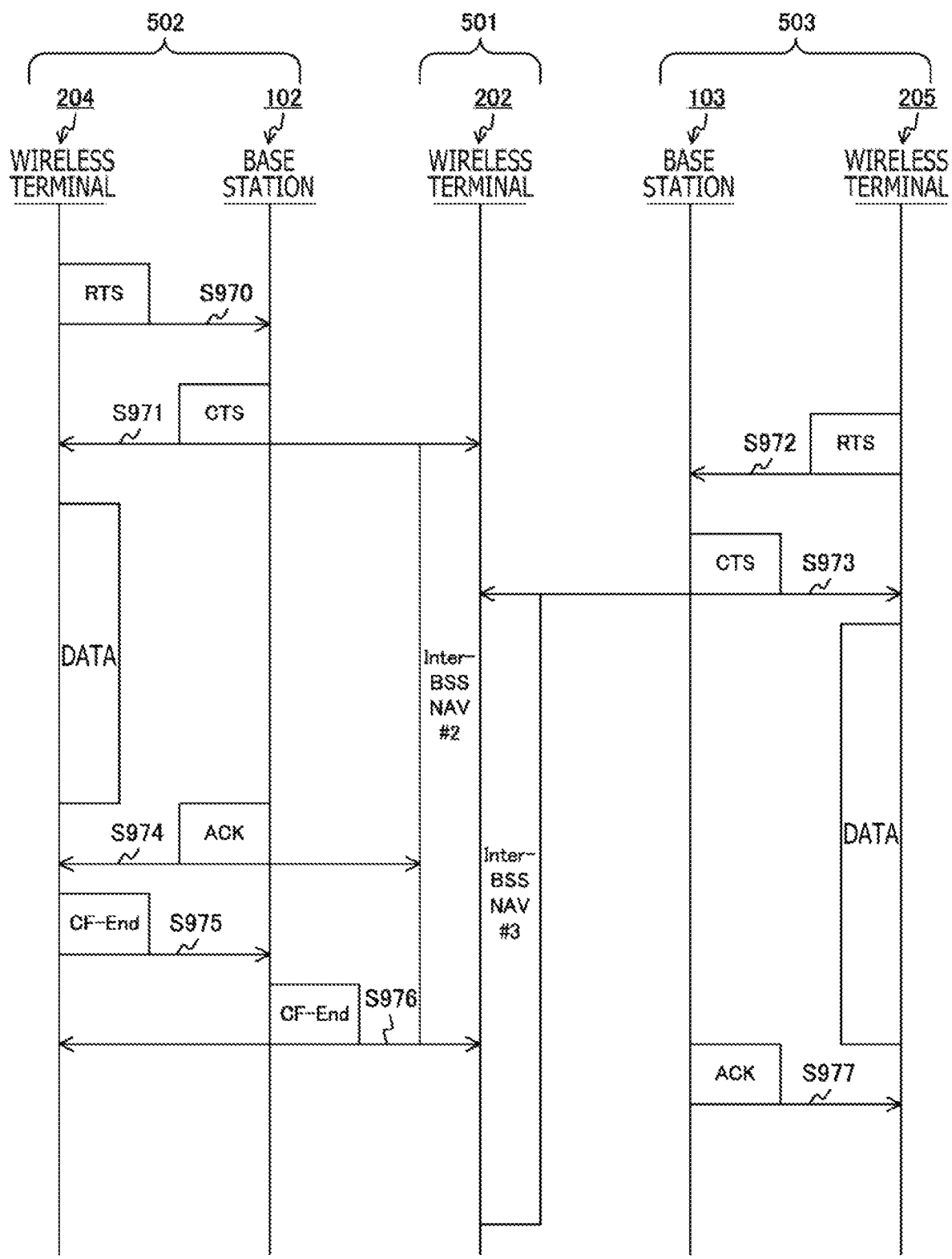
FIG. 22 is a sequence diagram depicting one example of RTS/CTS flow control of separately setting a NAV for each BSS according to the second embodiment of the present technique.

FIG. 22 is a sequence diagram depicting one example of RTS/CTS flow control of setting NAVs separately for respective BSSs according to the second embodiment of the present technique. The configuration of the communication system in FIG. 22 is assumed to be similar to that in FIG. 18. Also, the wireless terminal 202 in FIG. 22 is assumed to be unable to receive frames from the wireless terminals 204 and 205, as in FIG. 18.

When receiving a CTS frame from the base station 102 (step S971), the wireless terminal 202 refers to the terminal list information and acquires the BSS ID of the BSS 502 which corresponds to the destination of the frame. Since the BSS 502 is not an Intra-BSS and a NAV for the BSS 502 is not set at this time point, the wireless terminal 202 newly sets an Inter-BSS NAV #2 for the BSS 502.

Then, when receiving a CTS frame from the base station 103 (step S973), the wireless terminal 202 refers to the terminal list information and acquires the BSS ID of the BSS 503 which corresponds to the destination of the frame. Since the BSS 503 is not an Intra-BSS and a NAV for the BSS 503 is not set at this point, the wireless terminal 202 newly sets an Inter-BSS NAV #3 for the BSS 503.

Thereafter, when receiving a CF-End frame from the base station 102 (step S976), the wireless terminal 202 acquires a BSS ID from the frame, and initializes the Inter-BSS #2 which corresponds to the BSS ID. Even when the Inter-BSS NAV #2 is initialized, the Inter-BSS NAV #3 remains in a set state. Thus, the wireless terminal 202 does not start data transmission. Accordingly, frame collisions with the wireless terminal 205 can be avoided.

As described above, in the second embodiment of the present technique, a wireless terminal sets an Inter-BSS NAV for each of BSSs external to the Intra-BSS. Accordingly, even in a case where the number of external BSSs is two or more, a NAV is appropriately set, so that frame collisions can be avoided. In addition, even when a frame, such as a CTS frame, including only a reception address is received, an Inter-BSS NAV can be set for each BSS ID as a result of reference made to the terminal list information.

3. Third Embodiment

In the aforementioned first embodiment, the base station 101 transmits terminal list information each time a wireless terminal is connected or disconnected. However, a wireless terminal may fail to acquire the latest terminal list information due to a reception failure caused by a fluctuation of the radio wave condition etc. For example, when each base station regularly transmits a beacon including the MAC addresses in the Intra-BSS, wireless stations can acquire the latest terminal list information. The base station 101 of the third embodiment differs from that of the first embodiment in that a beacon is regularly transmitted.

Figure 23:
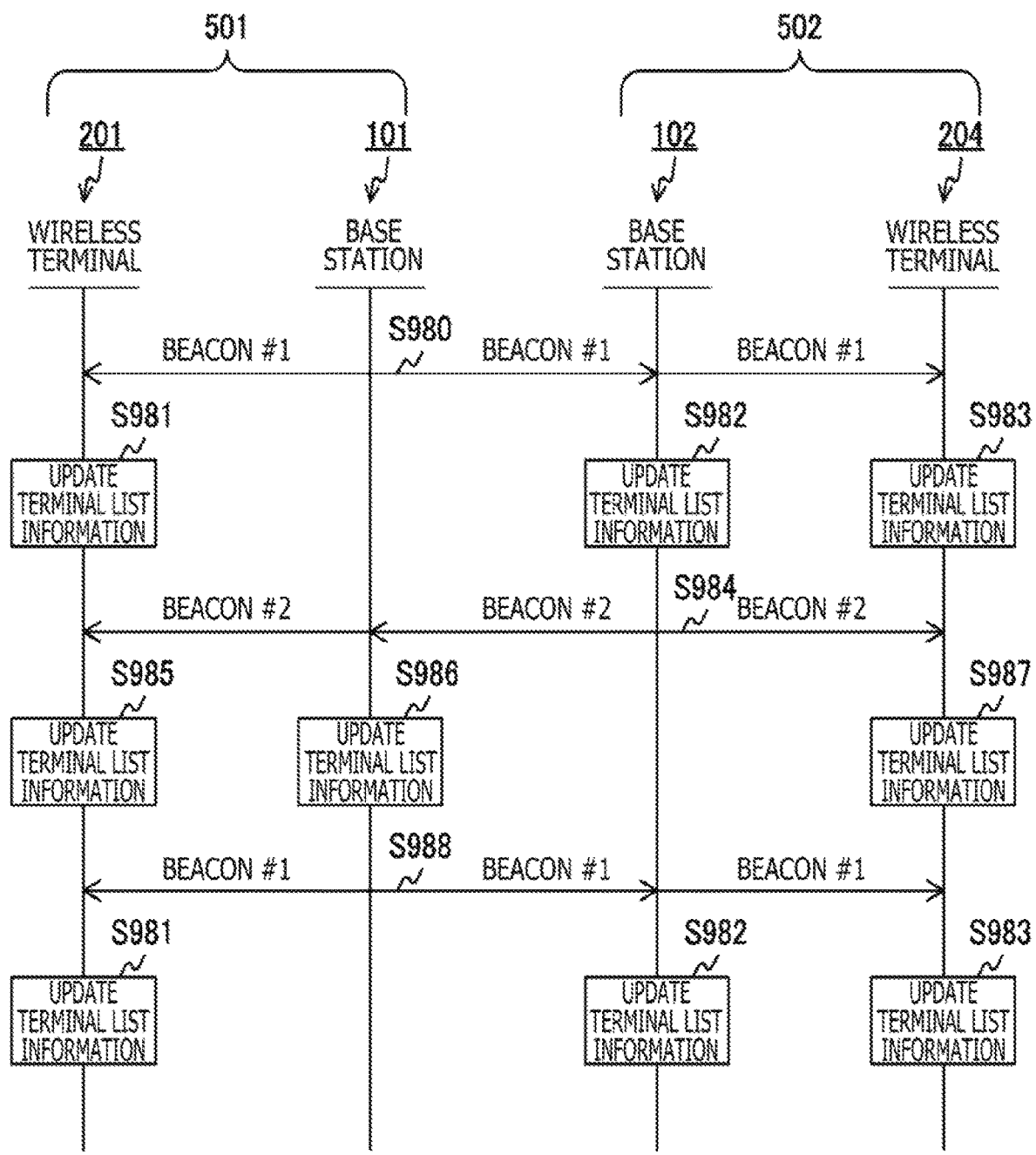
FIG. 23 is a sequence diagram depicting one example of control of regularly transmitting a beacon according to a third embodiment of the present technique.

FIG. 23 is a sequence diagram depicting one example of control of regularly transmitting a beacon according to the third embodiment of the present technique. A base station of the third embodiment differs from that of the first embodiment in that the base station generates a beacon including all the MAC addresses in the Intra-BSS, and regularly transmits the beacon by broadcasting.

Operation of the BSS 501 to which the base station 101 and the wireless terminal 201 belong, and operation of the BSS 502 to which the base station 102 and the wireless terminal 204 belong, will be described. Note that operation of the BSS 503 is similar to those of the BSS 501 and the BSS 502.

The base station 101 generates a beacon #1 including all the MAC addresses in the BSS 501, and transmits the beacon #1 (step S980). At this time point, the wireless terminal 201 has already received and held terminal list information. Further, the base station 102 and the wireless terminal 204 are assumed to hold terminal list information not including the addresses in the BSS 501. In addition, all the wireless stations are assumed to be able to receive beacons.

The wireless terminal 201 having received the beacon #1 updates the terminal list information on the basis of the beacon #1 (step S981). For example, the wireless terminal 201 updates the addresses in the BSS 501 in the terminal list information by using the MAC addresses in the beacon #1. Accordingly, even when a wireless terminal is connected or disconnected before transmission of the beacon #1, the terminal list information is updated to the latest information.

Also, the base station 102 having received the beacon #1 updates the terminal list information in the base station 102 on the basis of the beacon #1 (step S982). For example, the base station 102 adds, to the terminal list information, the BSS ID of the BSS 501 and the MAC addresses in the BSS 501 in association with each other. The wireless terminal 204 having received the beacon #1 also updates the terminal list information on the basis of the beacon #1 (step S983).

Next, the base station 102 generates a beacon #2 including the terminal list information, and transmits the beacon #2 (step S984). The wireless terminal 201 having received the beacon #2 updates the terminal list information in the wireless terminal 201 on the basis of the beacon #2 (step S985). Also, the base station 101 and the wireless terminal 204 having received the beacon #2 update the terminal list information in the base station 101 and the wireless terminal 204 on the basis of the beacon #2 (steps S986 and S987).

Hereinafter, similarly, a beacon is regularly transmitted, and a wireless station having received the beacon updates terminal list information in the wireless station on the basis of the beacon.

Figure 24:
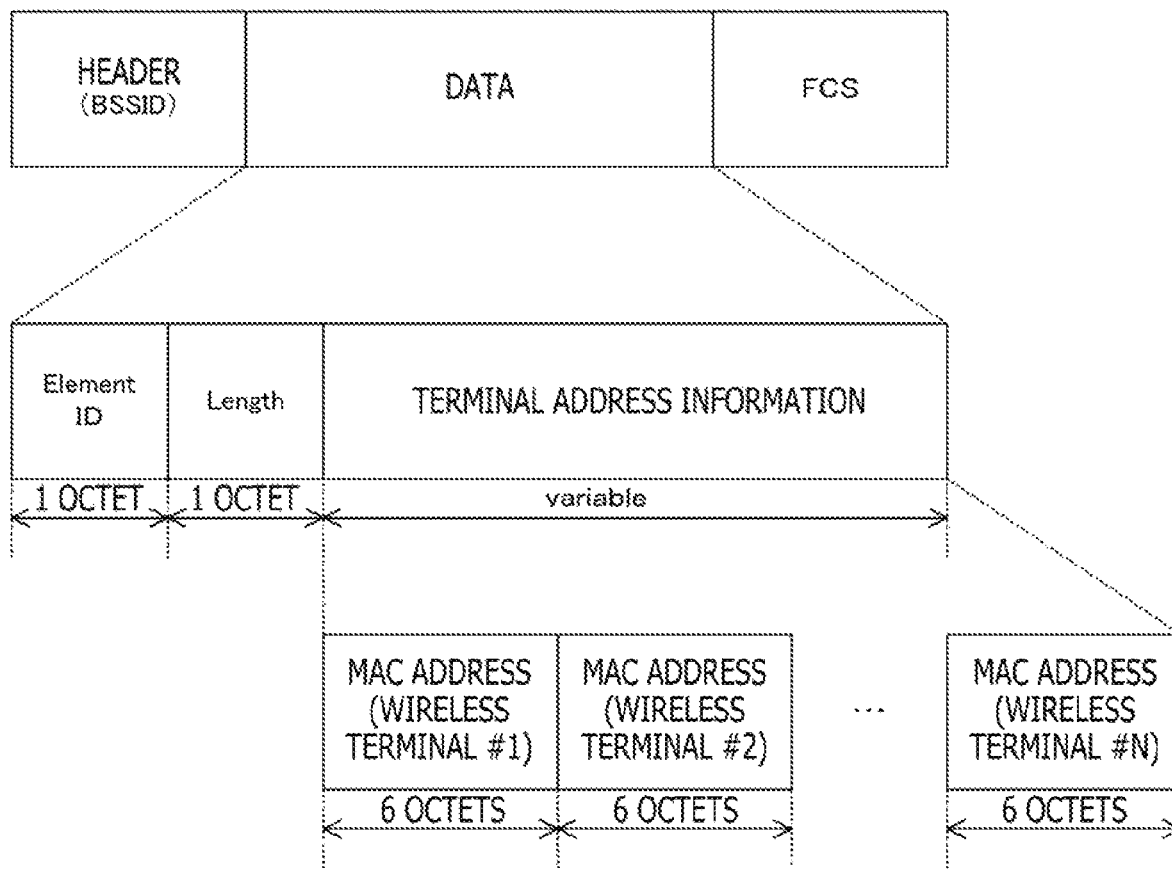
FIG. 24 is a diagram depicting one example of the data structure of a beacon according to the third embodiment of the present technique.

FIG. 24 is a diagram depicting one example of the data structure of a beacon according to the third embodiment of the present technique. The beacon includes a header, data, and an FCS.

The header includes the BSS ID of a BSS (i.e., Intra-BSS) to which a transmission station belongs. Further, the data includes an "Element ID" field, a "Length" field, and a "terminal address information" field.

The Element ID field includes identification information for identifying information elements in the beacon. The Length field includes information indicating the length of the frame. The terminal address information field includes all the MAC addresses of the wireless terminals in the Intra-BSS.

As described above, according to the third embodiment of the present technique, a base station regularly transmits a beacon including the MAC addresses in the Intra-BSS. Accordingly, a wireless station can acquire the latest terminal list information on the basis of the beacon.

4. Fourth Embodiment

In the aforementioned third embodiment, the base station 101 transmits a beacon including all the MAC addresses in the Intra-BSS. However, with an increase of the number of wireless terminals in the Intra-BSS, the number of the MAC addresses is increased, so that the data size of a beacon is increased. When the data size of a beacon is large, all the MAC addresses may not be stored in the beacon due to restriction on the entire frame length. The base station 101 of the fourth embodiment differs from that of the third embodiment in that the base station 101 transmits a beacon the data size of which is suppressed.

Figure 25:
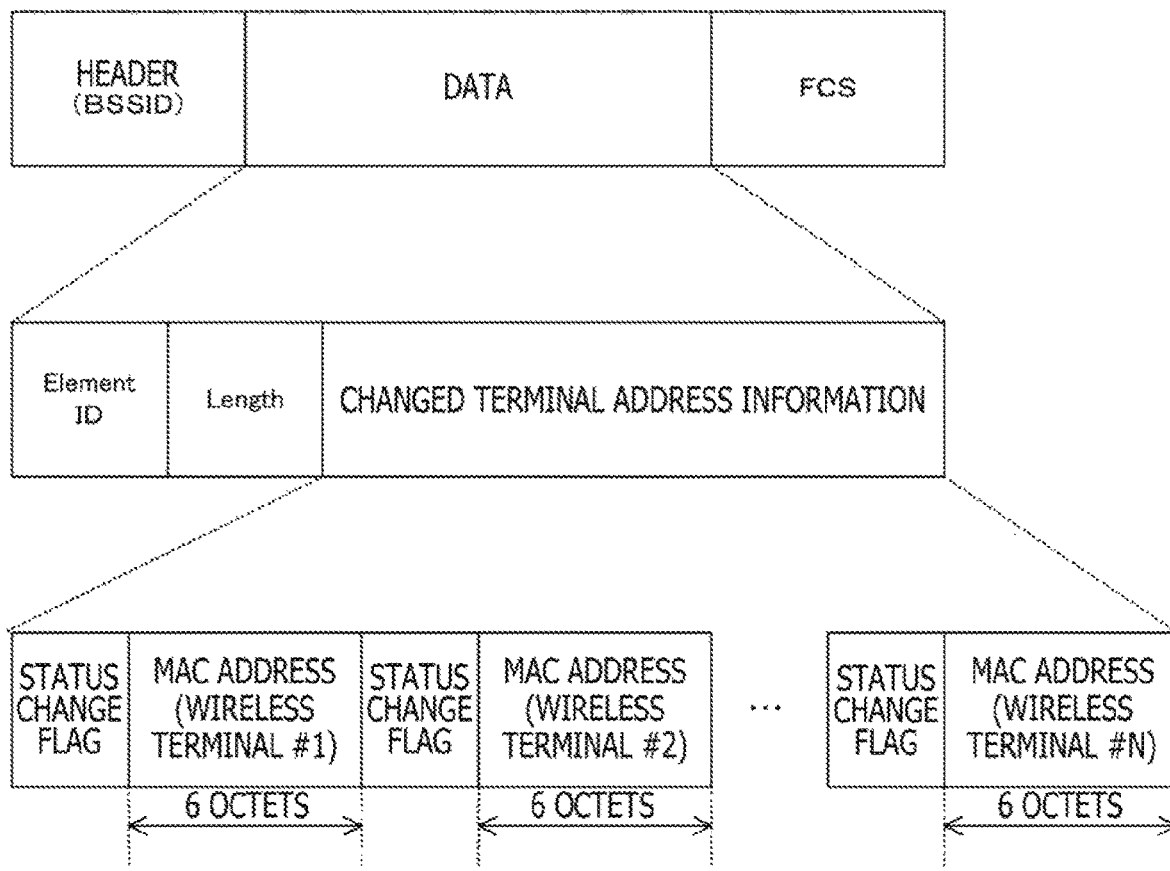
FIG. 25 is a diagram depicting one example of the data structure of a beacon according to a fourth embodiment of the present technique.

FIG. 25 is a diagram depicting one example of the data structure of a beacon according to the fourth embodiment of the present technique. A beacon of the fourth embodiment differs from that of the first embodiment in that the beacon includes, in the terminal address information therein, only the MAC address of a wireless terminal that is newly connected or disconnected, instead of all the MAC addresses in the Intra-BSS. Further, the fourth embodiment differs from the first embodiment in that a beacon further includes a status change flag for each MAC address.

A status change flag indicates whether a wireless terminal having a corresponding MAC address is a newly connected terminal or a disconnected terminal. For example, in a case where a new wireless terminal is connected in the Intra-BSS after transmission of the previous beacon, "1" is set to the status change flag. In contrast, in a case where a wireless terminal is disconnected from the Intra-BSS, "0" is set to the status change flag.

Thus, in the fourth embodiment of the present technique, a beacon includes only the MAC address of a connected or disconnected wireless terminal. Accordingly, compared with a case in which all the MAC addresses are included, the data size of a beacon can be made smaller.

5. Fifth Embodiment

In the aforementioned third embodiment, a base station transmits a beacon including terminal address information. However, in some cases, a wireless terminal cannot receive a beacon from the outside of the Intra-BSS according to the radio wave condition. The communication system of the fifth embodiment differs from that of the third embodiment in that, even in a case where no beacon is sent from the outside of the Intra-BSS, the latest terminal list information is acquired by a wireless terminal.

Figure 26:
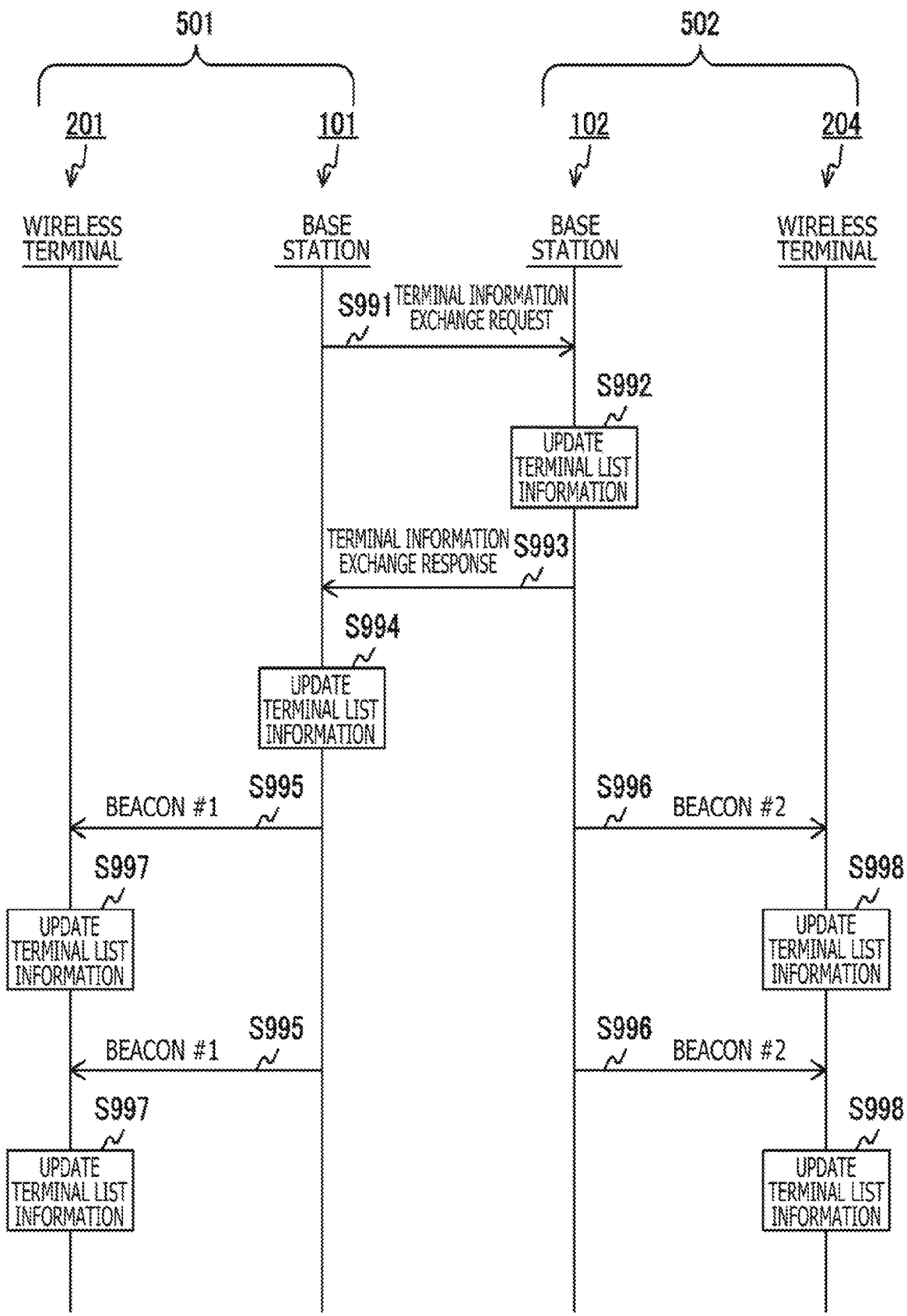
FIG. 26 is a sequence diagram depicting one example of control of exchanging terminal address information according to a fifth embodiment of the present technique.

FIG. 26 is a sequence diagram depicting one example of control of exchanging terminal address information according to the fifth embodiment of the present technique. A base station of the fifth embodiment does not transmit any beacon including terminal address information, but exchanges the terminal address information with another base station by unicasting, instead. For example, in a case where the base station 101 detects the base station 102 or where a wireless terminal is newly connected or disconnected in the BSS 501, the base station 101 generates a terminal information exchange request including terminal address information about the base station 101 itself, and transmits the terminal information exchange request to the base station 102 (step S991).

The base station 102 having received the terminal information exchange request updates the terminal list information on the basis of the terminal information exchange request (step S992), generates a terminal information exchange response including terminal address information about the base station 102 itself, and returns the terminal information exchange response to the base station 101 (step S993).

Note that, although a base station transmits a terminal information exchange request when detecting another base station, for example, a base station may be configured to regularly transmit a terminal information exchange request.

The base station 101 having received the terminal information exchange response updates the terminal list information on the basis of the terminal information exchange response (step S994). Then, the base station 101 generates a beacon #1 including the terminal list information, and regularly transmits the beacon #1 by broadcasting (step S995). Meanwhile, the base station 102 generates a beacon #2 including the terminal list information, and regularly transmits the beacon #2 by broadcasting (step S996).

The wireless terminal 201 updates the terminal list information on the basis of the beacon #1 (step S997), while the wireless terminal 204 updates the terminal list information on the basis of the beacon #2 (step S998).

Here, it is assumed that the beacon #1 in the BSS 501 does not arrive at the wireless terminal 204 in the adjacent BSS 502. Even in this case, the terminal list information in the base station 102 is the latest as a result of exchange of the terminal address information, and the beacon #2 including this information is transmitted to the wireless terminal 204. Thus, the wireless terminal 204 can acquire the latest terminal list information. Similarly, the wireless terminal 201 can acquire the latest terminal list information.

Figure 27:
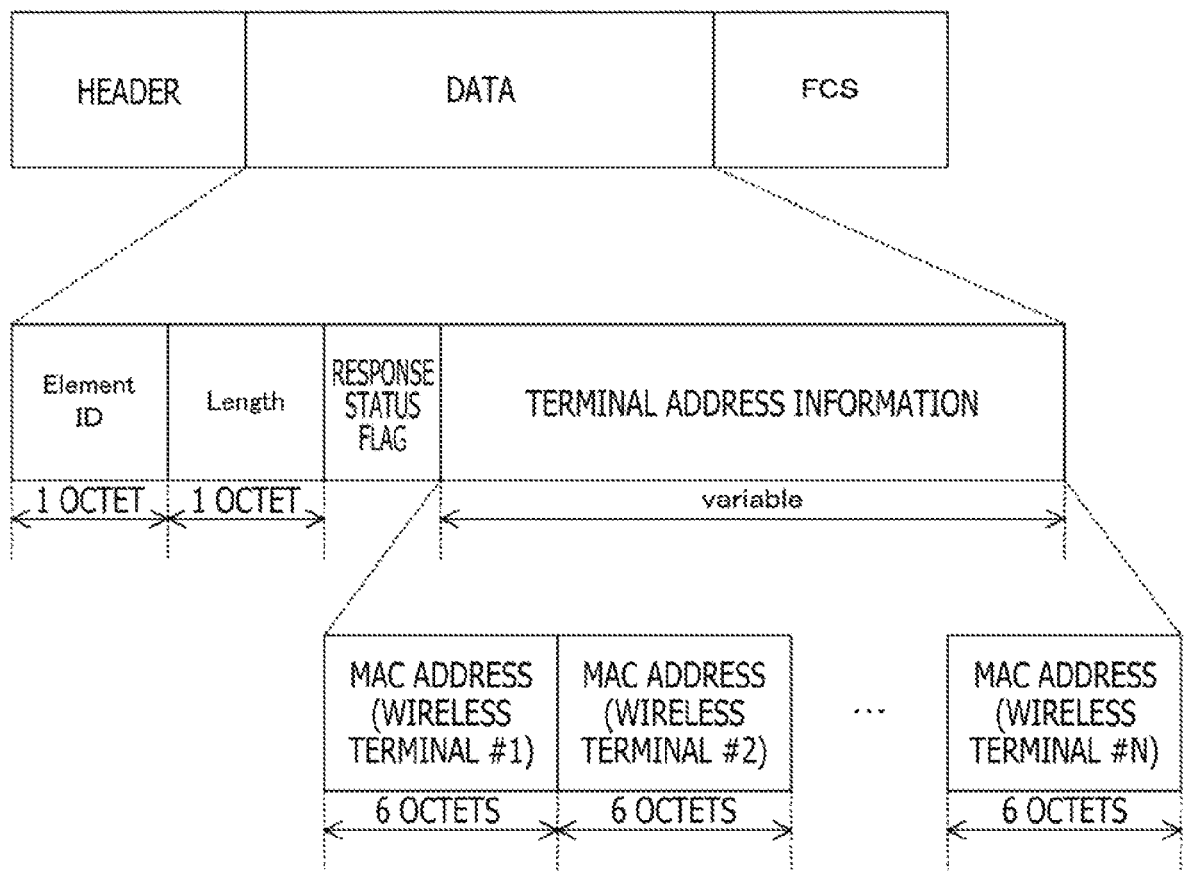
FIG. 27 is a diagram depicting one example of the data structure of a terminal information exchange request according to the fifth embodiment of the present technique.

FIG. 27 is a diagram illustrating one example of the data structure of a terminal information exchange request according to the fifth embodiment of the present technique. The configuration of the terminal information exchange request is similar to that of a beacon according to the third embodiment, except that a response status flag is further included. In addition, the configuration of a terminal information exchange response is similar to that of the terminal information exchange request, except that the value of a response status flag is different.

The response status flag indicates whether a frame including this flag is a terminal information exchange request or a terminal information exchange response. For example, in a case where the frame is a terminal information exchange request, "1" is set to the response status flag, and in a case where the frame is a terminal information exchange response, "0" is set to the response status flag.

Note that, although the response status flag and the terminal address information are stored in the same Element, the configuration is not limited to this. For example, the response status flag may be stored in an Element having an Element ID different from that of an Element in which the terminal address information is stored.

Figure 28:
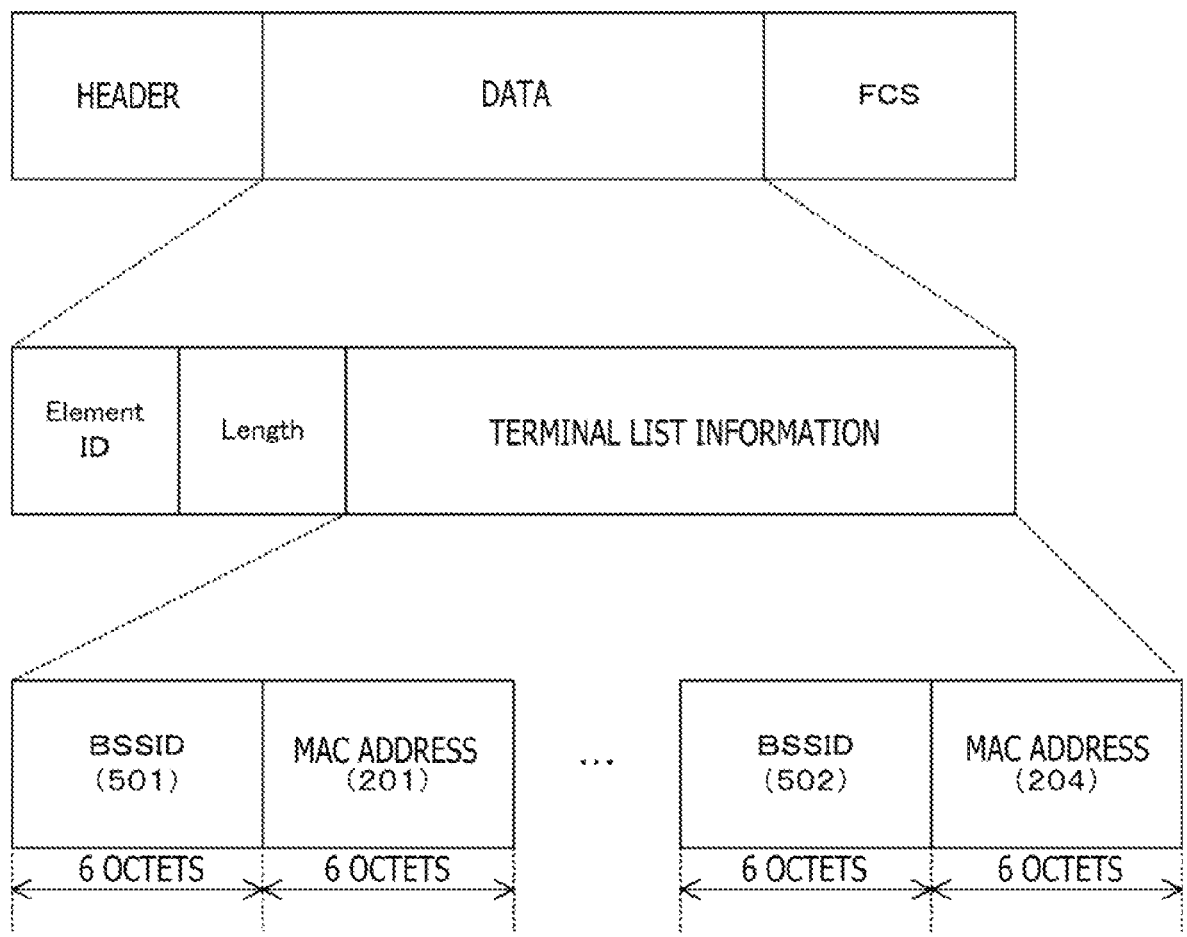
FIG. 28 is a diagram depicting one example of the data structure of a beacon according to the fifth embodiment of the present technique.

FIG. 28 is a diagram depicting one example of the data structure of a beacon according to the fifth embodiment of the present technique. The configuration of a beacon according to the fifth embodiment differs from that of a beacon according to the third embodiment in that the beacon includes terminal list information, instead of terminal address information.

Terminal list information according to the fifth embodiment includes, for each wireless terminal, a set including a BSS ID and the MAC address of the wireless terminal corresponding to the BSS ID. For example, the wireless terminal 201 is assumed to be connected to the BSS 501 and the wireless terminal 204 is assumed to be connected to the BSS 502. In this case, the terminal list information includes a set including the BSS ID of the BSS 501 and the MAC address of the wireless terminal 201, and a set including the BSS ID of the BSS 502 and the MAC address of the wireless terminal 204.

Note that a base station according to the fifth embodiment may separately use terminal address information and terminal list information when transmitting the MAC addresses belonging to the Intra-BSS. For example, in a case where a base station transmits the MAC addresses belonging to the Intra-BSS, the base station may transmit a beacon including terminal address information to the inside of the Intra-BSS, and may transmit a beacon including terminal list information including the BSS ID to the outside of the Intra-BSS. The reason for this separate usage is that the wireless terminals in the Intra-BSS each hold the BSS ID of the Intra-BSS. Further, a base station according to the fifth embodiment may transmit a beacon including the changed terminal address information of the fourth embodiment, instead of the terminal list information.

Thus, in the fifth embodiment of the present technique, base stations exchange terminal address information with one another and each transmit a beacon including terminal list information. Accordingly, even in a case where a beacon cannot be received from the outside, a wireless terminal can acquire the latest terminal list information.

Note that the aforementioned embodiments each exemplify one example for embodying the present technique, and the features of the embodiments have the correspondence relation with the invention-specifying features of the claims. Similarly, the invention-specifying features of the claims have the correspondence relation with components, of the embodiments, referred to as the same names. However, the present technique is not limited to the embodiments, and can be embodied by various modifications of the embodiments within the scope of the gist of the present technique.

Moreover, the process steps described in the aforementioned embodiments may be regarded as a method including a series of these steps, or may be regarded as a program for causing a computer to execute the series of these steps or a recording medium having the program stored therein. For example, a CD (Compact Disc), an MD (MiniDisc), a DVD (Digital Versatile Disc), a memory card, a Blu-ray (registered trademark) disc, or the like can be used as the recording medium.

Note that the effects described in the present description are merely examples, and thus, are not limited. In addition, another effect may be provided.

Note that the present technique can also take the configurations as follows.

(1) A wireless terminal including:

a communication unit receiving terminal list information including respective addresses of wireless terminals belonging to a predetermined network; and a control unit, in a case where a frame a destination of which is the address included in the received terminal list information is received, setting a period to prohibit data transmission until communication in the predetermined network is completed, and, in a case where a frame a destination of which is another address not included in the terminal list information is received, setting a period to prohibit data communication until communication in a network to which the other address belongs is completed.

(2) The communication system according to (1), in which the predetermined network includes an internal network to which the wireless terminal belongs and an external network which does not fall under the internal network.

(3) The communication system according to (2), in which in a case where the frame the destination of which is the address belonging to the internal network is received, the control unit sets the period to prohibit data transmission as an internal transmission prohibition period, and in a case where the frame the destination of which is the address belonging to the external network or the other network is received, the control unit sets the period to prohibit data transmission as a basic transmission prohibition period.

(4) The communication system according to (2), in which in a case where the frame the destination of which is the address belonging to the internal network is received, the control unit sets the period to prohibit data transmission as an internal transmission prohibition period, and in a case where the frame the destination of which is the address belonging to the external network is received, the control unit sets the period to prohibit data transmission as an inter-network transmission prohibition period separately for each external network, and in a case where the frame the destination of which is the other address is received, the control unit sets the period to prohibit data transmission as a basic transmission prohibition period.

(5) The communication system according to any of (2) to (4), in which the communication unit regularly receives terminal address information including the addresses corresponding to the internal network, and the control unit updates the terminal list information on the basis of the terminal address information.

(6) The communication system according to any of (2) to (4), in which the communication unit receives changed terminal address information including an address of at least one of, among the wireless terminals, a terminal that is newly connected to the internal network and a terminal that is disconnected from the internal network, and the control unit updates the terminal list information on the basis of the changed terminal address information.

(7) The communication system according to (2), in which the communication unit performs communication in accordance with the IEEE (the Institute of Electrical and Electronics Engineers) 802.11 standard, and the frames include a CTS (Clear To Send) frame.

(8) A communication system including:

a base station generating and transmitting terminal list information including respective addresses of wireless terminals belonging to a predetermined network; and a wireless terminal that, in a case where a frame a destination of which is the address included in the transmitted terminal list information is received, setting a period to prohibit data transmission until communication in the predetermined network is completed, and in a case where a frame a destination of which is another address not included in the terminal list information is received, setting a period to prohibit data communication until communication in a network to which the other address belongs is completed.

(9) The communication system according to (8), in which the base station exchanges the terminal address information with another base station by unicasting, and regularly transmits, to the wireless terminal, terminal address information including an address corresponding to the internal network, and the base station updates the terminal list information on the basis of the exchanged terminal address information.

(10) A wireless terminal control method including:

a communication step of receiving terminal list information including respective addresses of wireless terminals belonging to a predetermined network; and a control step of, in a case where a frame a destination of which is the address included in the received terminal list information is received, setting a period to prohibit data transmission until communication in the predetermined network is completed, and in a case where a frame a destination of which is another address not included in the terminal list information is received, setting a period to prohibit data communication until communication in a network to which the other address belongs is completed.

REFERENCE SIGNS LIST 101, 102, 103 Base station
110, 210 Communication unit
120, 220 Control unit
130, 230 Storage unit
201 to 205 Wireless terminal

The invention claimed is:

1. A wireless terminal, comprising:
a communication unit configured to:
receive terminal list information, wherein the terminal list information includes a plurality of addresses of a plurality of wireless terminals that belongs to a first network; and
a control unit configured to:
set a first period to prohibit data transmission until communication of a first frame in the first network is completed, wherein the first period is set based on inclusion of an address of a destination of the first frame in the terminal list information, and addition of a current time to a duration value associated with the first frame; and
set a second period to prohibit data communication until communication of a second frame in a second network is completed, wherein
the second period is set based on absence of an address of a destination of the second frame in the terminal list information, and
the address of the destination of the second frame belongs to the second network.

2. The wireless terminal according to claim 1, wherein the first network includes an internal network and an external network,
the wireless terminal belongs to the internal external network, and
the external network does not fall under the internal network.

3. The wireless terminal according to claim 2, wherein the control unit is further configured to:
set the first period as an internal transmission prohibition period based on a destination of a third frame that belongs to the internal network, and
set the second period as a basic transmission prohibition period based on a destination of a fourth frame that belongs to one of the external network or a network other than the first network.

4. The wireless terminal according to claim 2, wherein the control unit is further configured to:
set the first period as an internal transmission prohibition period based on a destination of a third frame that belongs to the internal network, and
set the second period as an inter-network transmission prohibition period for the external network based on a destination of a fourth frame that belongs to the external network, and
set the second period as a basic transmission prohibition period based on a destination of a fifth frame that belongs to a network other than the first network.

5. The wireless terminal according to claim 2, wherein the communication unit is further configured to receive terminal address information,
the terminal address information includes addresses corresponding to the internal network, and
the control unit is further configured to update the terminal list information based on a basis of the terminal address information.

6. The wireless terminal according to claim 2, wherein the communication unit is further configured to receive changed terminal address information,
the changed terminal address information includes an address of at least one of, among the plurality of wireless terminals, a terminal that is newly connected to the internal network or a terminal that is disconnected from the internal network, and
the control unit is further configured to update the terminal list information based on the changed terminal address information.

7. The wireless terminal according to claim 1, wherein the communication unit is further configured to perform communication based on IEEE (Institute of Electrical and Electronics Engineers) 802.11 standard, and
each of the first frame and the second frame includes a CTS (Clear To Send) frame.

8. A communication system, comprising:
a first base station configured to:
generate terminal list information, wherein the terminal list information includes a plurality of addresses of a plurality of wireless terminals that belongs to a first network; and transmit the generated terminal list information to the plurality of wireless terminals; and a wireless terminal of the plurality of wireless terminals is configured to:

set a first period to prohibit data transmission until communication of a first frame in the first network is completed, wherein the first period is set based on inclusion of an address of a destination of the first frame in the terminal list information, and addition of a current time to a duration value associated with the first frame; and set a second period to prohibit data communication until communication of a second frame in a second network is completed, wherein the second period is set based on absence of an address of a destination of the second frame in the terminal list information, and the address of the destination of the second frame belongs to the second network.

9. The communication system according to claim 8, wherein the first base station is further configured to:

unicast terminal address information to a second base station to exchange the terminal address information with the second base station; and transmit the terminal address information to the wireless terminal, wherein the terminal address information includes an address corresponding to an internal network, and update the terminal list information based on the unicasted terminal address information.

10. A wireless terminal control method, comprising:

receiving terminal list information, wherein the terminal list information includes a plurality of addresses of a plurality of wireless terminals belonging to a first network;

setting a first period to prohibit data transmission until communication of a first frame in the first network is completed, wherein the first period is set based on inclusion of an address of a destination of the first frame in the terminal list information, and addition of a current time to a duration value associated with the first frame; and setting a second period to prohibit data communication until communication of a second frame in a second network is completed, wherein the second period is set based on absence of an address of a destination of the second frame in the terminal list information, and the address of the destination of the second frame belongs to the second network.

* * * * *